(12) United States Patent
Lin et al.

(10) Patent No.: US 8,473,712 B2
(45) Date of Patent: *Jun. 25, 2013

(54) METHOD FOR MANAGING A MEMORY APPARATUS, AND ASSOCIATED MEMORY APPARATUS THEREOF

(75) Inventors: Tsai-Cheng Lin, Hsinchu (TW); Chun-Kun Lee, Hsinchu (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,636

(22) Filed: Sep. 6, 2012

(65) Prior Publication Data

US 2012/0331215 A1 Dec. 27, 2012

Related U.S. Application Data

(63) Continuation of application No. 12/471,462, filed on May 25, 2009, now Pat. No. 8,285,970.

(60) Provisional application No. 61/112,173, filed on Nov. 6, 2008, provisional application No. 61/140,850, filed on Dec. 24, 2008.

(51) Int. Cl.
*G06F 9/34* (2006.01)

(52) U.S. Cl.
USPC ........... 711/209; 711/170; 711/202; 711/203; 711/206

(58) Field of Classification Search
USPC .................... 711/170, 202, 203, 206, 209
See application file for complete search history.

(56) References Cited

U.S. PATENT DOCUMENTS

| | | | |
|---|---|---|---|
| 6,449,689 | B1 | 9/2002 | Corcoran |
| 6,938,144 | B2 | 8/2005 | Toyama |
| 2005/0154818 | A1 | 7/2005 | Chen |
| 2007/0174582 | A1 | 7/2007 | Feldman |
| 2007/0276988 | A1 | 11/2007 | Luo |
| 2007/0300130 | A1 | 12/2007 | Gorobets |
| 2008/0148004 | A1 | 6/2008 | Iren |
| 2009/0125699 | A1 | 5/2009 | Beadnell |
| 2009/0157947 | A1 | 6/2009 | Lin |
| 2009/0172345 | A1 | 7/2009 | Allen |
| 2009/0172466 | A1 | 7/2009 | Royer |
| 2009/0198952 | A1 | 8/2009 | Khmelnitsky |

FOREIGN PATENT DOCUMENTS

| | | |
|---|---|---|
| CN | 1472747 A | 2/2004 |
| CN | 1936867 A | 3/2007 |
| JP | 2005122529 A | 5/2005 |
| JP | 2007199846 A | 8/2007 |
| JP | 2007310823 A | 11/2007 |
| TW | 200719157 | 5/2007 |

*Primary Examiner* — Hoai V Ho
*Assistant Examiner* — Jay Radke
(74) *Attorney, Agent, or Firm* — Winston Hsu; Scott Margo

(57) ABSTRACT

A method for managing a memory apparatus including at least one non-volatile (NV) memory element includes: providing at least one block of the memory apparatus with at least one local page address linking table within the memory apparatus, wherein the local page address linking table includes linking relationships between physical page addresses and logical page addresses of a plurality of pages; and building a global page address linking table of the memory apparatus according to the local page address linking table. More particularly, the step of providing the block with the local page address linking table further includes: building a temporary local page address linking table for the local page address linking table corresponding to programming/writing operations of the memory apparatus; and temporarily storing the temporary local page address linking table in a volatile memory of the memory apparatus, and updating the temporary local page address linking table when needed.

6 Claims, 29 Drawing Sheets

Global page address linking table

| LOG Page 0x0000 | |
| LOG Page 0x0001 | PHY Page 0x0001 |
| LOG Page 0x0002 | PHY Page 0x0000 |
| ⋮ | ⋮ |

FIG. 3B

Global page address linking table

| LOG Page 0x0000 | |
|---|---|
| LOG Page 0x0001 | PHY Page 0x0001 |
| LOG Page 0x0002 | PHY Page 0x0002 |
| ⋮ | ⋮ |

FIG. 3C

Global page address linking table

| | |
|---|---|
| LOG Page 0x0000 | |
| LOG Page 0x0001 | PHY Page 0x0001 |
| LOG Page 0x0002 | PHY Page 0x0002 |
| LOG Page 0x0003 | |
| LOG Page 0x0004 | |
| LOG Page 0x0005 | PHY Page 0x0003 |
| ⋮ | ⋮ |

FIG. 3D

Global page address linking table

| LOG Page 0x0000 |                  |
| LOG Page 0x0001 | PHY Page 0x0001  |
| LOG Page 0x0002 | PHY Page 0x0002  |
| LOG Page 0x0003 | PHY Page 0x0004  |
| LOG Page 0x0004 |                  |
| LOG Page 0x0005 | PHY Page 0x0003  |

FIG. 3E

Global page address linking table

| LOG Page 0x0000 | PHY Page 0x0124 |
| --- | --- |
| LOG Page 0x0001 | PHY Page 0x0001 |
| LOG Page 0x0002 | PHY Page 0x0002 |
| LOG Page 0x0003 | PHY Page 0x0004 |
| LOG Page 0x0004 | PHY Page 0x0126 |
| LOG Page 0x0005 | PHY Page 0x0003 |
| LOG Page 0x0006 |  |
| LOG Page 0x0007 | PHY Page 0x0005 |
| ⋮ | ⋮ |

FIG. 3F

Local page address linking table 1

| PHY Page 0x0127 | LOG Page 0x0006 |
| --- | --- |
| PHY Page 0x0128 | LOG Page 0x0002 |
| PHY Page 0x0129 | LOG Page 0x0101 |
| PHY Page 0x0130 | LOG Page 0x0102 |
| PHY Page 0x0131 | LOG Page 0x0103 |
| PHY Page 0x0132 | LOG Page 0x0107 |
| PHY Page 0x0133 | LOG Page 0x0110 |
| PHY Page 0x0134 | LOG Page 0x0108 |
| ⋮ | ⋮ |
| PHY Page 0x0251 | LOG Page 0x0100 |
| PHY Page 0x0252 | LOG Page 0x0109 |
| PHY Page 0x0253 | LOG Page 0x0104 |

FIG. 4

Global page address linking table

| LOG Page 0x0000 | PHY Page 0x0124 |
| LOG Page 0x0001 | PHY Page 0x0001 |
| LOG Page 0x0002 | PHY Page 0x0002 |
| LOG Page 0x0003 | PHY Page 0x0004 |
| LOG Page 0x0004 | PHY Page 0x0126 |
| LOG Page 0x0005 | PHY Page 0x0003 |
| LOG Page 0x0006 | PHY Page 0x0127 |
| LOG Page 0x0007 | PHY Page 0x0005 |
| ⋮ | ⋮ |

FIG. 5A

Global page address linking table

| LOG Page 0x0000 | PHY Page 0x0124 |
| LOG Page 0x0001 | PHY Page 0x0001 |
| LOG Page 0x0002 | PHY Page 0x0128 |
| LOG Page 0x0003 | PHY Page 0x0004 |
| LOG Page 0x0004 | PHY Page 0x0126 |
| LOG Page 0x0005 | PHY Page 0x0003 |
| LOG Page 0x0006 | PHY Page 0x0127 |
| LOG Page 0x0007 | PHY Page 0x0005 |
| ⋮ | ⋮ |

FIG. 5B

Valid page count table

| | |
|---|---|
| PHY BLK 0 | 3 |
| PHY BLK 1 | 0 |
| PHY BLK 2 | 0 |
| PHY BLK 3 | 0 |
| PHY BLK 4 | 0 |
| PHY BLK 5 | 0 |
| PHY BLK 6 | 0 |
| PHY BLK 7 | 0 |
| ⋮ | ⋮ |
| PHY BLK 4088 | 0 |
| PHY BLK 4089 | 0 |
| PHY BLK 4090 | 0 |
| PHY BLK 4091 | 0 |
| PHY BLK 4092 | 0 |
| PHY BLK 4093 | 0 |
| PHY BLK 4094 | 0 |
| PHY BLK 4095 | 0 |

FIG. 10B

Valid page count table

| | |
|---|---|
| PHY BLK 0 | 100 |
| PHY BLK 1 | 0 |
| PHY BLK 2 | 0 |
| PHY BLK 3 | 0 |
| PHY BLK 4 | 0 |
| PHY BLK 5 | 0 |
| PHY BLK 6 | 0 |
| PHY BLK 7 | 0 |
| ⋮ | ⋮ |
| PHY BLK 4088 | 0 |
| PHY BLK 4089 | 0 |
| PHY BLK 4090 | 0 |
| PHY BLK 4091 | 0 |
| PHY BLK 4092 | 0 |
| PHY BLK 4093 | 0 |
| PHY BLK 4094 | 0 |
| PHY BLK 4095 | 0 |

FIG. 10C

Valid page count table

| | |
|---|---|
| PHY BLK 0 | 99 |
| PHY BLK 1 | 1 |
| PHY BLK 2 | 0 |
| PHY BLK 3 | 0 |
| PHY BLK 4 | 0 |
| PHY BLK 5 | 0 |
| PHY BLK 6 | 0 |
| PHY BLK 7 | 0 |
| ⋮ | ⋮ |
| PHY BLK 4088 | 0 |
| PHY BLK 4089 | 0 |
| PHY BLK 4090 | 0 |
| PHY BLK 4091 | 0 |
| PHY BLK 4092 | 0 |
| PHY BLK 4093 | 0 |
| PHY BLK 4094 | 0 |
| PHY BLK 4095 | 0 |

FIG. 10D

Valid page count table

| | |
|---|---|
| PHY BLK 0 | 99 |
| PHY BLK 1 | 100 |
| PHY BLK 2 | 0 |
| PHY BLK 3 | 87 |
| PHY BLK 4 | 98 |
| PHY BLK 5 | 119 |
| PHY BLK 6 | 110 |
| PHY BLK 7 | 77 |
| ⋮ | ⋮ |
| PHY BLK 4088 | 65 |
| PHY BLK 4089 | 109 |
| PHY BLK 4090 | 111 |
| PHY BLK 4091 | 88 |
| PHY BLK 4092 | 86 |
| PHY BLK 4093 | 95 |
| PHY BLK 4094 | 0 |
| PHY BLK 4095 | 0 |

FIG. 10E

Valid page count table

| | |
|---|---|
| PHY BLK 0 | 40 |
| PHY BLK 1 | 50 |
| PHY BLK 2 | 0 |
| PHY BLK 3 | 87 |
| PHY BLK 4 | 98 |
| PHY BLK 5 | 119 |
| PHY BLK 6 | 110 |
| PHY BLK 7 | 77 |
| ⋮ | ⋮ |
| PHY BLK 4088 | 65 |
| PHY BLK 4089 | 109 |
| PHY BLK 4090 | 111 |
| PHY BLK 4091 | 88 |
| PHY BLK 4092 | 86 |
| PHY BLK 4093 | 95 |
| PHY BLK 4094 | 91 |
| PHY BLK 4095 | 0 |

FIG. 10F

Valid-page-position table

| | |
|---|---|
| PHY BLK 0 | 01011100101......11111 |
| PHY BLK 1 | 01011100100......11110 |
| PHY BLK 2 | 000000......00000000 |
| PHY BLK 3 | 01011100100......11110 |
| PHY BLK 4 | 01011100100......01110 |
| PHY BLK 5 | 01011100100......11110 |
| PHY BLK 6 | 11011100100......11111 |
| PHY BLK 7 | 01011100100......11010 |
| ⋮ | ⋮ |
| PHY BLK 4088 | 01011100100......11010 |
| PHY BLK 4089 | 01111100100......11110 |
| PHY BLK 4090 | 11011100100......11110 |
| PHY BLK 4091 | 01011100100......10110 |
| PHY BLK 4092 | 01011100100......11100 |
| PHY BLK 4093 | 01010100100......11110 |
| PHY BLK 4094 | 01011000100......11110 |
| PHY BLK 4095 | 000000......00000000 |

FIG. 11

METHOD FOR MANAGING A MEMORY APPARATUS, AND ASSOCIATED MEMORY APPARATUS THEREOF

CROSS REFERENCE TO RELATED APPLICATIONS

This application is a continuation application of U.S. patent application Ser. No. 12/471,462 filed on May 25, 2009. The U.S. patent application Ser. No. 12/471,462 claims the benefit of U.S. provisional application No. 61/112,173, which was filed on Nov. 6, 2008, and is entitled "METHOD FOR BUILDING A LOGICAL-TO-PHYSICAL ADDRESS LINKING TABLE OF A MEMORY APPARATUS". The U.S. patent application Ser. No. 12/471,462 further claims the benefit of U.S. provisional application No. 61/140,850, which was filed on Dec. 24, 2008, and entitled "METHOD FOR MANAGING AND ACCESSING A STORAGE APPARATUS".

BACKGROUND OF THE INVENTION

1. Field of the Invention

The present invention relates to flash memory control, and more particularly, to a method for managing a memory apparatus, and an associated memory apparatus thereof.

2. Description of the Prior Art

While a host is accessing a memory apparatus (e.g. a solid state drive, SSD), the host typically sends an accessing command and at least a corresponding logical address to the memory apparatus. The controller of the memory apparatus receives the logical address and transfers the logical address into a physical address by utilizing a logical-to-physical address linking table. Thus, the controller accesses at least one physical memory element (or memory component) of the memory apparatus by utilizing the physical address. For example, the memory element can be implemented with one or more flash memory chips (which can be referred to as flash chips for simplicity).

The logical-to-physical address linking table can be built in accordance with a memory unit in the memory element. For example, the logical-to-physical address linking table can be built by blocks or by pages. When the logical-to-physical address linking table is built by blocks, the logical-to-physical address linking table can be referred to as the logical-to-physical block address linking table. When the logical-to-physical address linking table is built by pages, the logical-to-physical address linking table can be referred to as the logical-to-physical page address linking table. In addition, a logical-to-physical page address linking table comprising linking relationships about pages of a plurality of blocks (or all blocks) in the memory apparatus can be referred to as the global page address linking table.

Assume that the memory element has X physical blocks, and each physical block has Y physical pages. In a situation where the logical-to-physical address linking table is built by blocks, the associated logical-to-physical block address linking table can be built by reading a logical block address stored in a page of each physical block and recording the relationship between the physical block and the associated logical block. In order to build the logical-to-physical block address linking table, X pages respectively corresponding to the X physical blocks have to be read, where the time required for this is assumed to be x seconds.

In a situation where the logical-to-physical address linking table is built by pages, the associated global page address linking table can be built by reading a logical page address stored in each physical page of all physical blocks and recording the relationship between the physical page and the associated logical page. In order to build the global page address linking table, at least X·Y pages have to be read, requiring x·Y seconds. If a block has 1024 pages, the time required for building the global page address linking table is 1024 times the time required for building the logical-to-physical block address linking table, i.e. 1024·x seconds, which is an unacceptable processing time since the processing speed is too slow. That is, when implementing the global page address linking table in this way, the overall performance of accessing the memory apparatus is retarded. Therefore, a novel method is required for efficiently building the logical-to-physical address linking table, and related methods for managing memory apparatus operated under the novel method is required.

SUMMARY OF THE INVENTION

It is therefore an objective of the present invention to provide a method for managing a memory apparatus, and to provide an associated memory apparatus thereof, in order to solve the above-mentioned problem.

It is another objective of the present invention to provide a method for managing a memory apparatus, and to provide an associated memory apparatus thereof, in order to optimize the arrangement of a spare region and a data region of the memory apparatus.

According to at least one preferred embodiment of the present invention, a method for managing a memory apparatus is disclosed. The memory apparatus comprises at least one non-volatile (NV) memory element, each of which comprises a plurality of blocks, and a processing unit, where the method is performed by the processing unit. The method comprises: providing at least one block of the memory apparatus with at least one local page address linking table within the memory apparatus, wherein the at least one local page address linking table comprises linking relationships between physical page addresses and logical page addresses of a plurality of pages; and building a global page address linking table of the memory apparatus according to the at least one local page address linking table. More particularly, the step of providing the block of the memory apparatus with the local page address linking table within the memory apparatus further comprises: building a temporary local page address linking table for the local page address linking table corresponding to programming/writing operations of the memory apparatus; and temporarily storing the temporary local page address linking table in a volatile memory of the memory apparatus, and further updating the temporary local page address linking table if any linking relationship between a physical page address and a logical page address of a page in the block is changed.

According to at least one preferred embodiment of the present invention, an associated memory apparatus comprises: at least one NV memory element, each of which comprises a plurality of blocks; and a processing unit. The processing unit is arranged to manage the memory apparatus according to a program code embedded in the processing unit or received from outside the processing unit. In addition, the processing unit is arranged to provide at least one block of the memory apparatus with at least one local page address linking table within the memory apparatus, and the at least one local page address linking table comprises linking relationships between physical page addresses and logical page addresses of a plurality of pages, wherein the processing unit is arranged to build a global page address linking table of the memory apparatus according to the at least one local page address linking table. Additionally, the processing unit builds a temporary local page address linking table for the local page address linking table corresponding to programming/writing operations of the memory apparatus. More particularly, before the data pages in the block are fully programmed, the processing unit temporarily stores the temporary local page address linking table in a volatile memory of the memory apparatus, and further updates the temporary local page address linking table if any linking relationship between a physical page address and a logical page address of a page in the block is changed.

It is an advantage of the present invention that, in contrast to the related art, the present invention method and apparatus can greatly save the time of building logical-to-physical address linking table(s), such as the time of building a global page address linking table. Therefore, the present invention provides better performance than the related art.

It is another advantage of the present invention that the present invention method and apparatus can record the usage information during accessing the pages, and therefore can efficiently manage the usage of all blocks according the usage information. As a result, the arrangement of the spare region and the data region can be optimized.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3A-3F respectively illustrate exemplary versions of a global page address linking table of the memory apparatus shown in FIG. 1 according to an embodiment of the present invention.

FIG. 4 illustrates a local page address linking table within a block of the flash chip shown in FIG. 2A according to an embodiment of the present invention.

FIGS. 5A-5B respectively illustrate exemplary versions of the global page address linking table of the memory apparatus shown in FIG. 1 according to the embodiment shown in FIG. 4.

FIGS. 10A-10F respectively illustrate exemplary versions of a valid page count table of the embodiment shown in FIGS. 7A-7D.

FIG. 11 illustrates a valid-page-position table of the flash chips shown in FIGS. 7A-7D according to an embodiment of the present invention.

DETAILED DESCRIPTION

Figure 1:
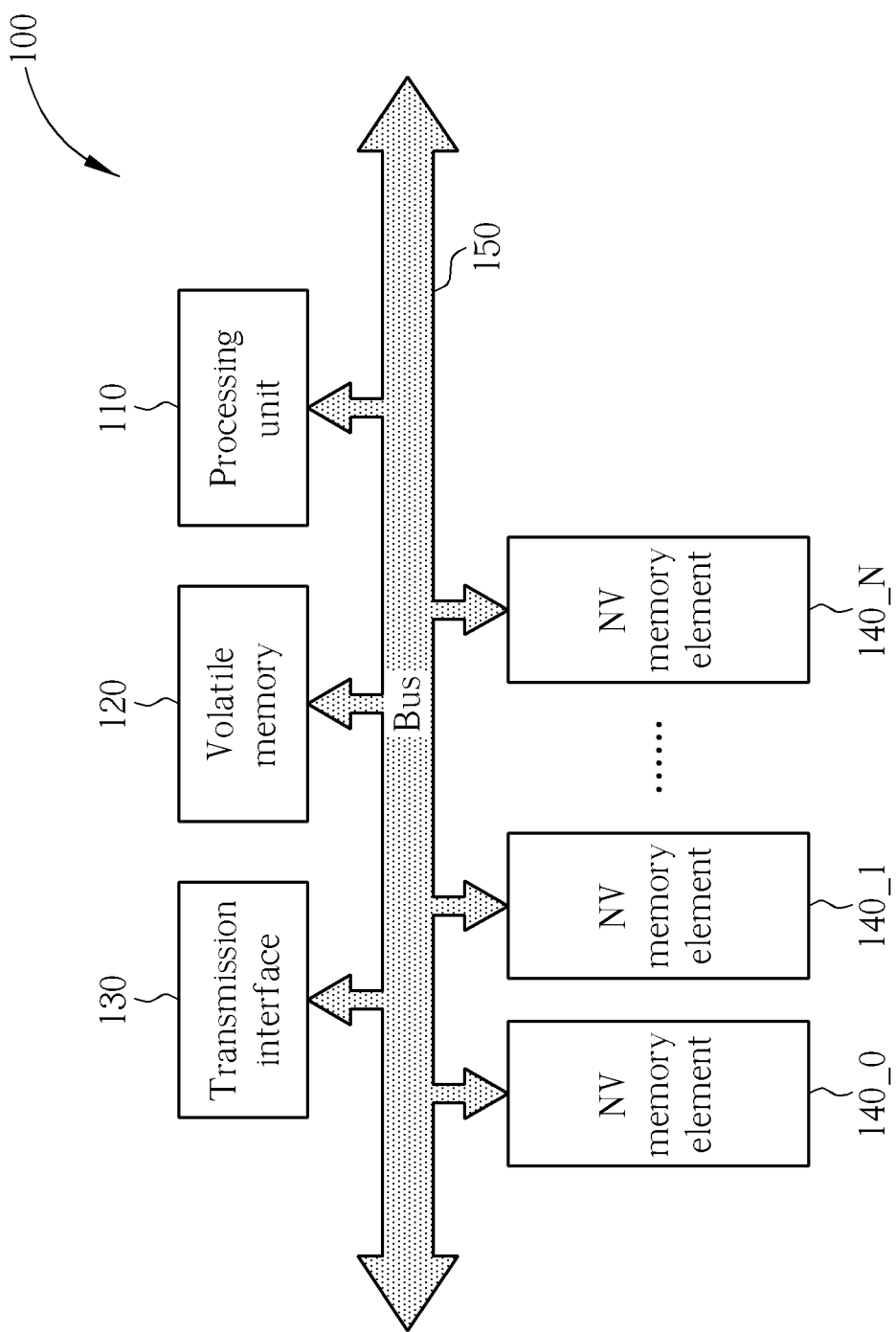
FIG. 1 is a block diagram of a memory apparatus according to a first embodiment of the invention.

Please refer to FIG. 1, which illustrates a block diagram of a memory apparatus 100 according to a first embodiment of the invention. The memory apparatus 100 comprises a processing unit 110, a volatile memory 120, a transmission interface 130, a plurality of non-volatile (NV) memory elements 140_0, 140_1, ..., and 140_N (e.g. flash chips), and a bus 150. Typically, a host (not shown in FIG. 1) can be arranged to access the memory apparatus 100 through the transmission interface 130 after the transmission interface 130 is coupled to the host. For example, the host can represent a personal computer such as a laptop computer or a desktop computer.

The processing unit 110 is arranged to manage the memory apparatus 100 according to a program code (not shown in FIG. 1) embedded in the processing unit 110 or received from outside the processing unit 110. For example, the program code can be a hardware code embedded in the processing unit 110, such as a ROM code. In another example, the program code can be a firmware code received from outside the processing unit 110. More particularly, the processing unit 110 is utilized for controlling the volatile memory 120, the transmission interface 130, the NV memory elements 140_0, 140_1, ..., and 140_N, and the bus 150. The processing unit 110 of this embodiment can be an ARM processor or an ARC processor. This is for illustrative purposes only, and is not meant to be a limitation of the present invention. According to different variations of this embodiment, the processing unit 110 can be other kinds of processors.

In addition, the volatile memory 120 is utilized for storing a global page address linking table, data accessed by the host (not shown), and other required information for accessing the memory apparatus 100. The volatile memory 120 of this embodiment can be a DRAM or an SRAM. This is for illustrative purposes only, and is not meant to be a limitation of the present invention. According to different variations of this embodiment, the volatile memory 120 can be other kinds of volatile memories.

According to this embodiment, the transmission interface 130 shown in FIG. 1 is utilized for transmitting data and commands between the host and the memory apparatus 100, where the transmission interface 130 complies with a particular communication standard such as the Serial Advanced Technology Attachment (SATA) standard, the Parallel Advanced Technology Attachment (PATA) standard, or the Universal Serial Bus (USB) standard. For example, the memory apparatus 100 is a solid state drive (SSD) installed within the host, and the particular communication standard can be some communication standard typically utilized for implementing internal communication of the host, such as the SATA standard or the PATA standard. In another example, the memory apparatus 100 is an SSD and is positioned outside the host, and the particular communication standard can be some communication standard typically utilized for implementing external communication of the host, such as the USB standard. This is for illustrative purposes only, and is not meant to be a limitation of the present invention. According to different variations of this embodiment, the memory apparatus 100 can be a portable memory device such as a memory card, and the particular communication standard can be some communication standards typically utilized for implementing an input/output interface of a memory card, such as the Secure Digital (SD) standard or the Compact Flash (CF) standard.

In addition, the NV memory elements 140_0, 140_1, ..., and 140_N are utilized for storing data, where the NV memory elements 140_0, 140_1, ..., and 140_N can be, but not limited to, NAND flash chips. The bus 150 is utilized for coupling the processing unit 110, the volatile memory 120, the transmission interface 130, and the NV memory elements 140_0, 140_1, ..., and 140_N, and for communication thereof.

According to this embodiment, the processing unit 110 can provide at least one block of the memory apparatus 100 with at least one local page address linking table within the memory apparatus 100, where the local page address linking table comprises linking relationships between physical page addresses and logical page addresses of a plurality of pages. In this embodiment, the processing unit 110 builds the local page address linking table during programming/writing operations of the memory apparatus 100. The processing unit 110 can further build the global page address linking table mentioned above according to the local page address linking table. For example, the processing unit 110 reads a first linking relationship between a first physical page address and a first logical page address from the at least one local page address linking table, and then records the first linking relationship into the global page address linking table. The processing unit 110 can further read a second linking relationship between a second physical page address and the first logical page address from the at least one local page address linking table, and then record the second linking relationship into the global page address linking table in order to update the global page address linking table.

More particularly, the processing unit 110 provides a plurality of blocks of the memory apparatus 100 with a plurality of local page address linking tables within the memory apparatus 100, respectively. That is, the aforementioned at least one local page address linking table comprises a plurality of local page address linking tables. The processing unit 110 can further build the global page address linking table mentioned above according to the local page address linking tables. More specifically, the processing unit 110 can read one of the local page address linking tables to update the global page address linking table mentioned above. For example, the first linking relationship of a first physical page is read from a first local page address linking table of the local page address linking tables, and the second linking relationship of a second physical page is read from a second local page address linking table of the local page address linking tables. Implementation details of the local page address linking tables are further described by referring to FIG. 2A.

Figure 2A:
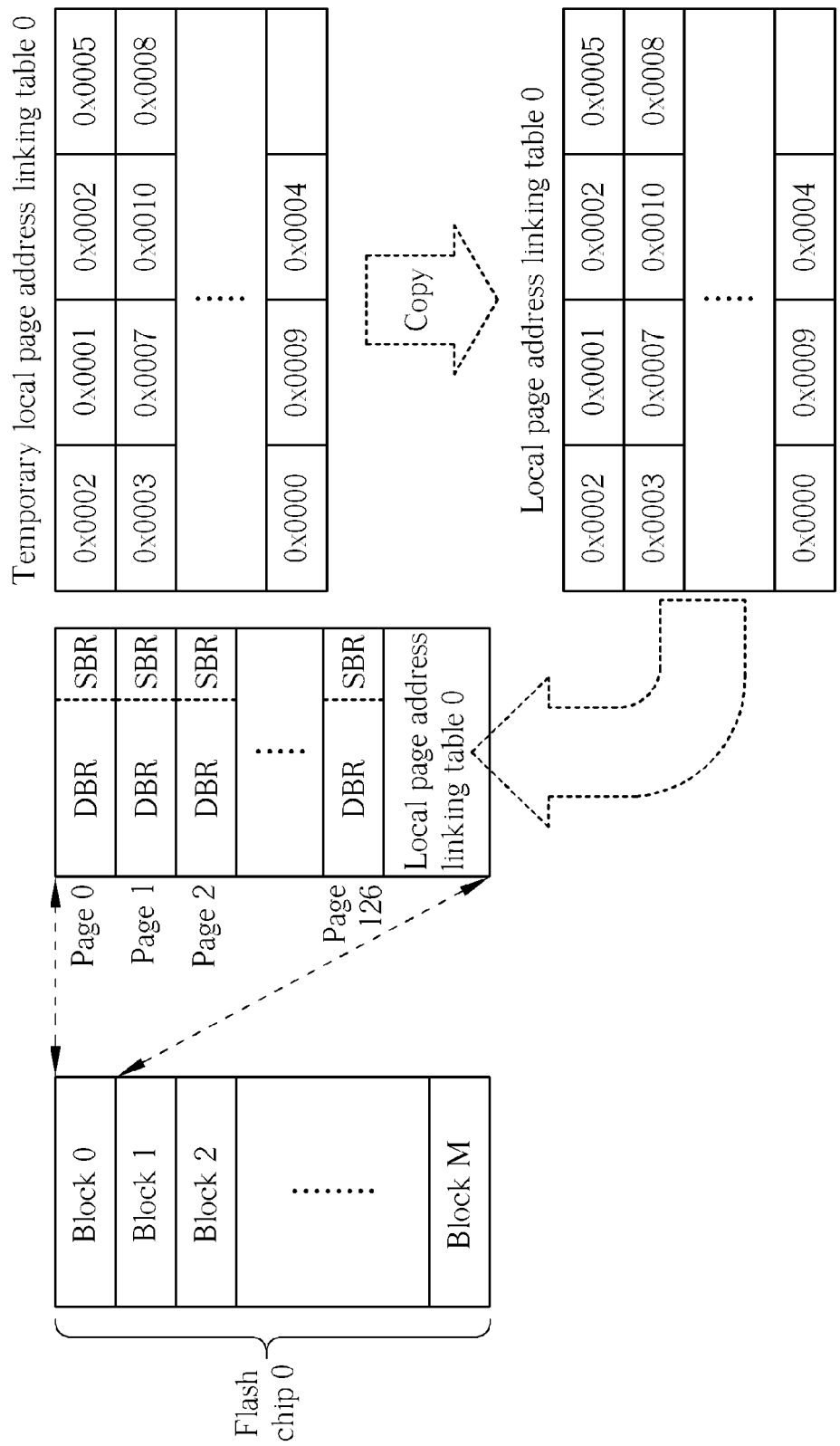
FIG. 2A illustrates a local page address linking table within a block of one of the NV memory elements shown in FIG. 1, where the NV memory element of this embodiment is a flash chip.

FIG. 2A illustrates a local page address linking table within a block of the NV memory element 140_0, where the NV memory element 140_0 of this embodiment is referred to as a flash chip 0 for simplicity. As shown in FIG. 2A, the flash chip 0 comprises a plurality of blocks, such as blocks 0, 1, 2, ..., M in this embodiment. Please note that a block is an erasing unit. In other words, when erasing data is required, the processing unit 110 erases all data stored in the block at a time. In addition, a block, such as the block 0 shown in FIG. 2A, comprises a plurality of pages. For example, the block 0 of the flash chip 0 comprises 128 pages. Within a block such as the block 0, the pages are divided into two areas, a data area for storing data and a table area for storing a local page address linking table 0. The pages in the data area of the block can be referred to as the data pages of the block.

According to this embodiment, the page amount of the data area and the page amount of the table area can be determined as required. For example, pages 0, 1, 2, ..., 126 is utilized for storing data and the remaining page of the block is utilized for storing the local page address linking table 0. This is for illustrative purposes only, and is not meant to be a limitation of the present invention. According to a variation of this embodiment, the data area may comprise less than 127 pages, and the table area may comprise two or more pages. According to another variation of this embodiment, the total page amount of the block, the page amount of the data area, and the page amount of the table area may vary. Please note that a page is a programming/writing unit. In other words, when programming/writing data is required, the processing unit 110 programs/writes a page of data into a page at a time. According to this embodiment, the NV memory elements 140_0, 140_1, ..., and 140_N shown in FIG. 1 are respectively referred to as the flash chips 0, 1, ..., and N, where each block of the NV memory elements 140_0, 140_1, ..., 140_N may have a local page address linking table. For simplicity, only the local page address linking table 0 of the block 0 of the flash chip 0 is illustrated in FIG. 2A since the functions/operations of each local page address linking table are similar to each other.

In this embodiment, the local page address linking table 0 is built when all the data pages in the block 0 have been programmed, namely fully programmed. Before the data pages in the block 0 are fully programmed, however, the processing unit 110 temporarily stores a temporary local page address linking table 0 in the volatile memory 120, and further updates the temporary local page address linking table 0 when any linking relationship between a physical page address and a logical page address in the block 0 is changed.

Figure 2B:
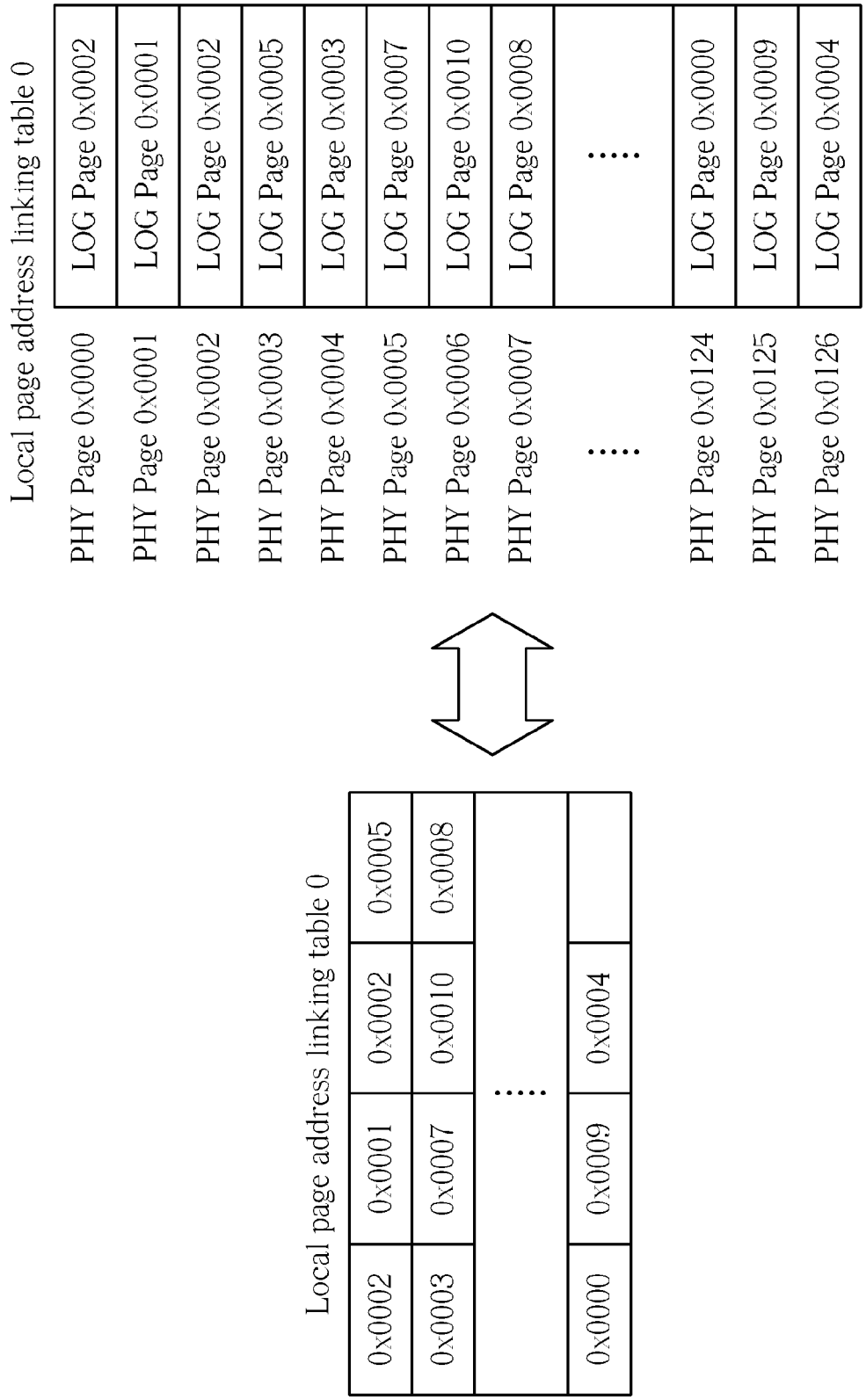
FIG. 2B compares the one-dimensional (1-D) array illustration and the two-dimensional (2-D) array illustration of the local page address linking table shown in FIG. 2A.

According to this embodiment, the ranking of a field (entry) of the temporary/non-temporary local page address linking table (e.g. the temporary local page address linking table 0 or the local page address linking table 0) represents a physical page address, and the content of this field represents an associated logical page address. For example, suppose that $i_P$ and $j_P$ are respectively the row number and the column number of the illustrative table location $(i_P, j_P)$ of the temporary/non-temporary local page address linking table shown in FIG. 2A and $i_P=0, 1, \ldots$, etc. and $j_P=0, 1, \ldots$, etc. In this two-dimensional (2-D) array illustration of the temporary/non-temporary local page address linking table shown in FIG. 2A, the illustrative table location $(i_P, j_P)$ corresponding to the $(i_P*4+j_P)^{th}$ field represents a physical page address PPN, which can be described as follows:

$$PPN=(PBN*DPC+i_P*4+j_P);$$

where the notation PBN stands for the physical block number of the physical block under discussion (e.g. PBN=0, 1, 2, ..., etc. for the blocks 0, 1, 2, ..., etc., respectively), and the notation DPC stands for the data page count of each block (e.g. 127 in this embodiment). This is for illustrative purposes only, and is not meant to be a limitation of the present invention. For better comprehension, the temporary/non-temporary local page address linking table can be illustrated as a single column, as shown in the right half of FIG. 2B, where "PHY Page" stands for "physical page", and "LOG Page" stands for "logical page". Given that $i_P$ is still the row number and $i_P=0, 1, \ldots$, etc., within the temporary/non-temporary local page address linking table of the block PBN of this one-dimensional (1-D) array illustration shown in the right half of FIG. 2B, the illustrative table location $i_P$ corresponding to the $i_P^{th}$ field represents a physical page address (PBN*DPC+$i_P$). That is, for this 1-D array illustration, the above equation can be re-written as follows:

PPN=(PBN*DPC+$i_P$).

Please note that, in this embodiment, a range of the logical page addresses in the local page address linking table 0 is not greater than the number of pages in the block 0 (i.e. 128 in this embodiment). This is for illustrative purposes only, and is not meant to be a limitation of the present invention. According to a variation of this embodiment, a range of the logical page addresses in a local page address linking table such as the local page address linking table 0 can be greater than the number of pages in a block such as the block 0.

Within the temporary local page address linking table 0 or the local page address linking table 0 shown in FIG. 2A, the illustrative table location (0, 0) (i.e. the upper-left location) corresponding to the first field represents the physical page address 0x0000, the illustrative table location (0, 1) corresponding to the second field represents the physical page address 0x0001, the illustrative table location (0, 2) corresponding to the third field represents the physical page address 0x0002, the illustrative table location (0, 3) corresponding to the fourth field represents the physical page address 0x0003, the illustrative table location (1, 0) corresponding to the fifth field represents the physical page address 0x0004, and so on.

According to the embodiment shown in FIG. 2A, when the host sends a command 0 to the processing unit 110 in order to program data 0 at a logical page address 0x0002, the processing unit 110 programs the data 0 and the logical page address 0x0002 into the page 0 of the block 0 of the flash chip 0, wherein the data 0 is programmed in a data byte region (labeled "DBR") of the page 0, and the logical page address 0x0002 is programmed in a spare byte region (labeled "SBR") of the page 0 as spare information. In addition, the processing unit 110 writes the logical page address 0x0002 into the first field of the temporary local page address linking table 0 (or the illustrative table location (0, 0) thereof in this embodiment, i.e. the illustrative table location of the first column and the first row) to thereby indicate that the logical page address 0x0002 links/maps to the page 0 of the block 0 of the flash chip 0, whose physical page address is 0x0000.

Similarly, when the host then sends a command 1 to the processing unit 110 in order to program data 1 at a logical page address 0x0001, the processing unit 110 programs the data 1 and the logical page address 0x0001 into the page 1 of the block 0 of the flash chip 0, wherein the data 1 is programmed in a data byte region (labeled "DBR") of the page 1, and the logical page address 0x0001 is programmed in a spare byte region (labeled "SBR") of the page 1 as spare information. In addition, the processing unit 110 writes the logical page address 0x0001 into the second field of the temporary local page address linking table 0 (or the illustrative table location (0, 1) thereof in this embodiment, i.e. the illustrative table location of the second column and the first row) to thereby indicate that the logical page address 0x0001 links/maps to page 1 of block 0 of flash chip 0, whose physical page address is 0x0001. Afterward, when the host sends a command 2 to the processing unit 110 in order to program data 2 at the logical page address 0x0002 again, the processing unit 110 programs the data 2 and the logical page address 0x0002 into the page 2 of the block 0, wherein the data 2 is programmed in a data byte region (labeled "DBR") of the page 2, and the logical page address 0x0002 is programmed in a spare byte region (labeled "SBR") of the page 2 as spare information. In addition, the processing unit 110 writes the logical page address 0x0002 into the third field of the temporary local page address linking table 0 (or the illustrative table location (0, 2) thereof in this embodiment, i.e. the illustrative table location of the third column and the first row) to thereby update that the logical page address 0x0002 links/maps to the page 2 of the block 0 of the flash chip 0, whose physical page address is 0x0002. Similar operations for the subsequent pages are not repeated in detail for simplicity.

As a result of the above operations, referring to the upper-right portion of FIG. 2A, a serial of logical page addresses {0x0002, 0x0001, 0x0002, 0x0005, 0x0003, 0x0007, 0x0010, 0x0008, . . . , 0x0000, 0x0009, 0x0004} are written in the temporary local page address linking table 0. When all the data pages in the block 0 (i.e. pages 0, 1, 2, . . . , 126 in this embodiment) have been programmed, the processing unit 110 copies the temporary local page address linking table 0 to build the local page address linking table 0. More specifically, the processing unit 110 programs the local page address linking table 0 into the table area (i.e. the remaining page 127) of the block 0 of the flash chip 0 in this embodiment. This is for illustrative purposes only, and is not meant to be a limitation of the present invention. According to a variation of this embodiment, the processing unit 110 can program a local page address linking table for a portion of data pages in a block, rather than all data pages of the block.

In this variation, after programming a first portion of data pages of a specific block, the processing unit 110 can program a first local page address linking table for the first portion of data pages, where the first local page address linking table is positioned next to the first portion of data pages. After programming a second portion of data pages of the specific block, the processing unit 110 can program a second local page address linking table for the second portion of data pages. For example, the second local page address linking table is positioned next to the second portion of data pages. In another example, the second local page address linking table is positioned at the end (e.g. the last page) of the specific block. In another example, the second local page address linking table is positioned at the beginning (e.g. the first page) of the block next to the specific block. In another example, the second local page address linking table is positioned at another page (or other pages) of the block next to the specific block.

FIGS. 3A-3F respectively illustrate exemplary versions of the aforementioned global page address linking table of the memory apparatus 100 according to an embodiment of the present invention. When building the global page address linking table of the memory apparatus 100, the processing unit 110 reads each of the local page address linking tables respectively corresponding to the blocks of the memory apparatus 100 to build the global page address linking table. For example, within the memory apparatus 100, if only the blocks 0 and 1 of the flash chip 0 have been fully programmed, and if the local page address linking table 0 in the block 0 and the local page address linking table 1 in the block 1 have been built, the processing unit 110 reads the local page address linking tables 0 and 1 to build the global page address linking table.

Figure 3A:
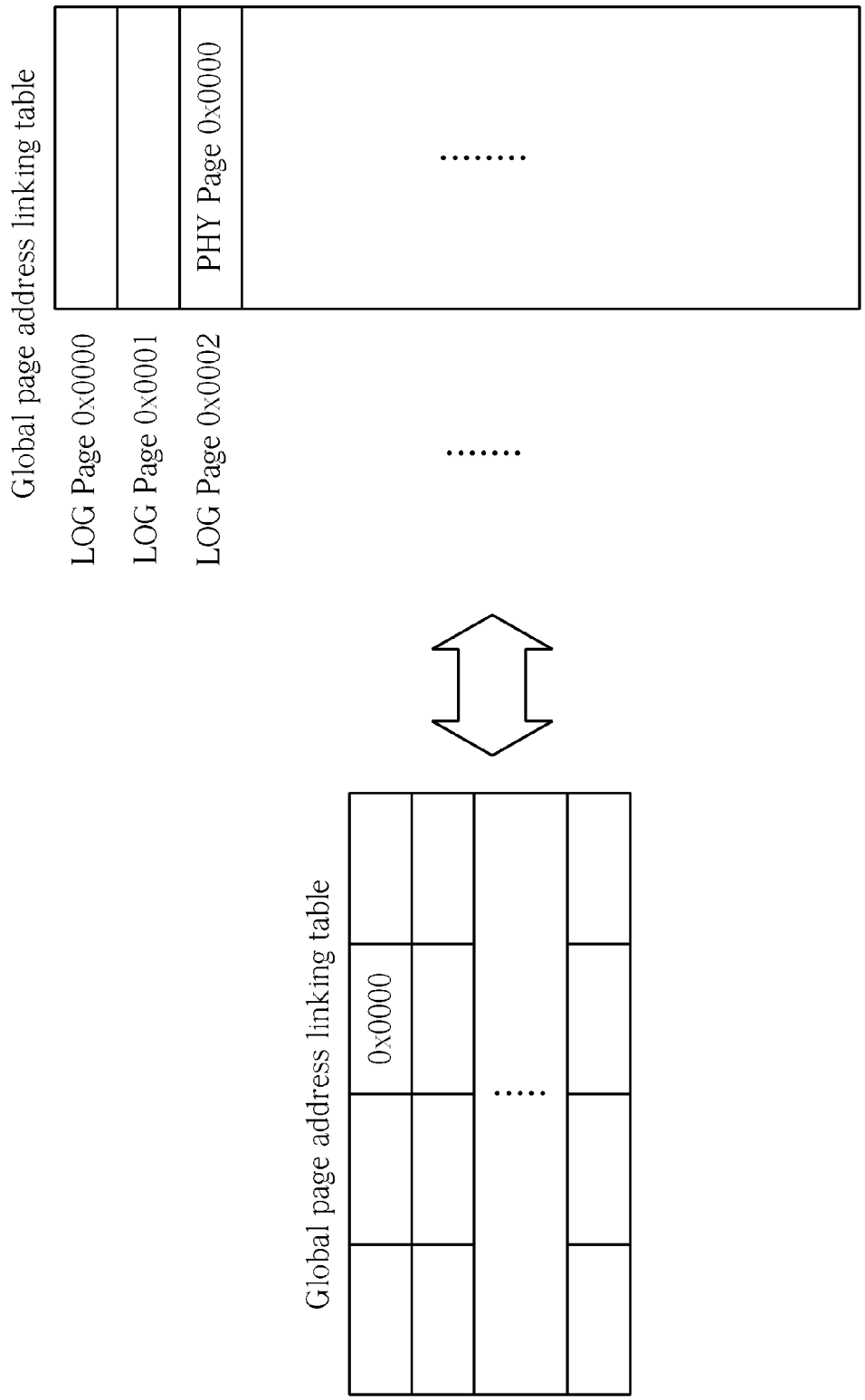

According to this embodiment, referring to the left half of FIG. 3A first, the ranking of a field of the global page address linking table represents a logical page address, and the content of this field represents an associated physical page address. For example, given that $i_L$ and $j_L$ are respectively the row number and the column number of the illustrative table location ($i_L$, $j_L$) of the global page address linking table shown in the left half of FIG. 3A and $i_L$=0, 1, . . . , etc. and $j_L$=0, 1, . . . , etc. in this 2-D array illustration, the illustrative table location ($i_L$, $j_L$) corresponding to the ($i_L$*4+$j_L$)$^{th}$ field represents a logical page address ($i_L*4+j_L$). This is for illustrative purposes only, and is not meant to be a limitation of the present invention. For better comprehension, the global page address linking table can be illustrated as a single column, as shown in the right half of FIG. 3A. Given that $i_L$ is still the row number and $i_L=0, 1, \ldots$, etc., within this 1-D array illustration of the global page address linking table, the illustrative table location $i_L$ corresponding to the $i_L{}^{th}$ field represents a logical page address $i_L$.

Within the global page address linking table shown in the left half of FIG. 3A, the illustrative table location (0, 0) (i.e. the upper-left location) corresponding to the first field represents the logical page address 0x0000, the illustrative table location (0, 1) corresponding to the second field represents the logical page address 0x0001, the illustrative table location (0, 2) corresponding to the third field represents the logical page address 0x0002, the illustrative table location (0, 3) corresponding to the fourth field represents the logical page address 0x0003, the illustrative table location (1, 0) corresponding to the fifth field represents the logical page address 0x0004, and so on.

When building the global page address linking table, the processing unit 110 reads the first field of the local page address linking table 0 shown in FIG. 2A and obtains the logical page address 0x0002, and therefore determines that the logical page address 0x0002 links to the page 0 of the block 0 of the flash chip 0, whose physical page address is 0x0000. As shown in FIG. 3A, the processing unit 110 writes the physical page address 0x0000 (PHY Page 0x0000) into the third field of the global page address linking table (i.e. the illustrative table location (0, 2) of the 2-D array illustration thereof) to indicate that the logical page address 0x0002 (LOG Page 0x0002) links to the physical page address 0x0000.

Next, the processing unit 110 reads the second field of the local page address linking table 0 shown in FIG. 2A and obtains the logical page address 0x0001, and therefore determines that the logical page address 0x0001 links to the page 1 of the block 0 of the flash chip 0, whose physical page address is 0x0001. As shown in FIG. 3B, the processing unit 110 writes the physical page address 0x0001 into the second field of the global page address linking table to indicate that the logical page address 0x0001 (LOG Page 0x0001) links to the physical page address 0x0001 (PHY Page 0x0001).

Then, the processing unit 110 reads the third field of the local page address linking table 0 shown in FIG. 2A and obtains the logical page address 0x0002, and therefore determines that the logical page address 0x0002 links to the page 2 of the block 0 of the flash chip 0, whose physical page address is 0x0002. As shown in FIG. 3C, the processing unit 110 writes (or updates) the physical page address 0x0002 into the third field of the global page address linking table to indicate that the logical page address 0x0002 (LOG Page 0x0002) links to the physical page address 0x0002 (PHY Page 0x0002).

Subsequently, the processing unit 110 reads the fourth field of the local page address linking table 0 shown in FIG. 2A and obtains the logical page address 0x0005, and therefore determines that the logical page address 0x0005 links to the page 3 of the block 0 of the flash chip 0, whose physical page address is 0x0003. As shown in FIG. 3D, the processing unit 110 writes the physical page address 0x0003 into the sixth field of the global page address linking table to indicate that the logical page address 0x0005 (LOG Page 0x0005) links to the physical page address 0x0003 (PHY Page 0x0003).

Afterward, the processing unit 110 reads the fifth field of the local page address linking table 0 shown in FIG. 2A and obtains the logical page address 0x0003, and therefore determines that the logical page address 0x0003 links to the page 4 of the block 0 of the flash chip 0, whose physical page address is 0x0004. As shown in FIG. 3E, the processing unit 110 writes the physical page address 0x0004 into the fourth field of the global page address linking table to indicate that the logical page address 0x0003 (LOG Page 0x0003) links to the physical page address 0x0004 (PHY Page 0x0004). Similar operations for the subsequent linking relationships are not repeated in detail. After reading all fields of the local page address linking table 0 shown in FIG. 2A and filling the corresponding physical page addresses into the associated fields of the global page address linking table, the processing unit 110 builds the global page address linking table as shown in FIG. 3F.

FIG. 4 illustrates the local page address linking table 1 within the block 1 of the flash chip 0 according to an embodiment of the present invention. After reading all fields of the local page address linking table 0 shown in FIG. 2A and filling the corresponding physical page addresses into the associated fields of the global page address linking table as shown in FIG. 3F, the processing unit 110 further reads the local page address linking table 1 within the block 1 in order to complete the global page address linking table. Please note that, in this embodiment, the local page address linking table 1 is built when all data pages in the block 1 have been programmed. This is for illustrative purposes only, and is not meant to be a limitation of the present invention. According to a variation of this embodiment, a local page address linking table can be built for a block when at least a data page (e.g. a data page or a plurality of pages) in this block have been programmed. In this variation, the local page address linking table is built for this block, and more particularly, for at least the data page. For example, the local page address linking table is built for a few data pages such as physical pages 0 and 1 of this block, where the local page address linking table for the physical pages 0 and 1 is built and stored in the subsequent physical page, i.e. the physical page 2. When building (or updating) the global page address linking table, in a situation where there is no local page address linking table found in the last page of this block, the processing unit 110 tries to find the last programmed page of this block. In this variation, the processing unit 110 searches back, starting from the last page, in order to find the last programmed page of this block. As a result, the processing unit 110 reads all fields of the local page address linking table from the last programmed page of this block and fills the corresponding physical page addresses into the associated fields of the global page address linking table, in order to complete/update the global page address linking table.

According to the embodiment shown in FIG. 4, the processing unit 110 reads the first field of the local page address linking table 1 and obtains the logical page address 0x0006, and therefore determines that the logical page address 0x0006 links to the page 0 of the block 1 of the flash chip 0, whose physical page address is 0x0127 in this embodiment. As shown in FIG. 5A, the processing unit 110 writes the physical page address 0x0127 into the seventh field of the global page address linking table to indicate that the logical page address 0x0006 (LOG Page 0x0006) links to the physical page address 0x0127 (PHY Page 0x0127).

Next, the processing unit 110 reads the second field of the local page address linking table 1 shown in FIG. 4 and obtains the logical page address 0x0002, and therefore determines that the logical page address 0x0002 links to the page 1 of the block 1 of the flash chip 0, whose physical page address is 0x0128. As shown in FIG. 5B, the processing unit 110 writes (or updates) the physical page address 0x0128 into the third field of the global page address linking table to indicate that the logical page address 0x0002 (LOG Page 0x0002) links to the physical page address 0x0128 (PHY Page 0x0128). Similar operations for the subsequent linking relationships are not repeated in detail. After reading all fields of the local page address linking tables 0 and 1 and filling the corresponding physical page addresses into the associated fields of the global page address linking table, the processing unit 110 completes the global page address linking table.

Instead of reading all pages (or memory units) of the NV memory elements 140_0, 140_1, . . . , and 140_N to build the global page address linking table, the processing unit 110 of this embodiment merely reads a few number of local page address linking tables within (or representing but not within) the blocks that are fully or partially programmed. Therefore, the memory apparatus implemented according to the present invention surely have better efficiency than those implemented according to the related art.

According to a variation of this embodiment, in a situation where all data pages of all data blocks of the NV memory elements 140_0, 140_1, . . . , and 140_N are fully programmed, the processing unit 110 merely reads the local page address linking tables respectively corresponding to the data blocks to build the global page address linking table. If the NV memory elements 140_0, 140_1, . . . , and 140_N have $X_D$ data blocks in total, and each data block has $Y_D$ data pages, the processing unit 110 reads $X_D$ local page address linking tables (whose data amount is typically less than $X_D$ pages in total) to build the global page address linking table, rather than reading $X_D \cdot Y_D$ pages. In other words, the time required for building the global page address linking table according to the present invention is similar to the time required for building the global block address linking table.

According to another variation of this embodiment, in a situation where a particular block is not fully programmed (i.e. the particular block is partially programmed), at one time there is no local page address linking table within the particular block. In the volatile memory 120, however, there is a temporary local page address linking table of the particular block. The processing unit 110 of this variation can program/write the temporary local page address linking table to the particular block before shutting down the memory apparatus 100. For example, after the memory apparatus 100 begins a start-up process, the host can read the local page address linking table stored in the particular block, in order to build or update the global page address linking table. This is for illustrative purposes only, and is not meant to be a limitation of the present invention. In another example, after the memory apparatus 100 begins a start-up process, the processing unit 110 can read the pages programmed in the particular block, and more particularly, the spare byte region of each page programmed in the particular block, in order to build or update the global page address linking table.

In a situation where the processing unit 110 reads the pages programmed in the particular block to build or update the global page address linking table, the processing unit 110 has to read less than $Y_D$ pages of data from the particular block. As a result, for completing the global page address linking table, the data amount that the processing unit 110 has to read is less than $(X_{FP}+Y_{PP})$ pages, given that the NV memory elements 140_0, 140_1, . . . , and 140_N have $X_{FP}$ fully programmed blocks in total and further have a partially programmed block having $Y_{PP}$ programmed data pages. Therefore, in regard to building the global page address linking table, the memory apparatus implemented according to the present invention still have better efficiency than those implemented according to the related art.

According to different variations of the embodiments mentioned above, the global page address linking table can be built during any start-up process of the memory apparatus 100 or at any time in response to a request from a user.

According to different variations of the embodiments mentioned above, the global page address linking table can be divided into a plurality of partial tables stored in one or more of the NV memory elements (e.g. the partial tables are respectively stored in the NV memory elements 140_0, 140_1, . . . , and 140_N). Each divided partial table can be referred as a sub-global page address linking table. The processing unit 110 can read and store at least one sub-global page address linking table (e.g. a sub-global page address linking table, some sub-global page address linking tables, or all the sub-global page address linking tables) of the global page address linking table into the volatile memory 120, depending on the size of the global page address linking table and the size of the volatile memory 120 or depending on some requirements. The processing unit 110 can utilize the sub-global page address linking table stored in the volatile memory 120 to perform the logical-to-physical address transferring operations of the aforementioned embodiments.

Figure 6:
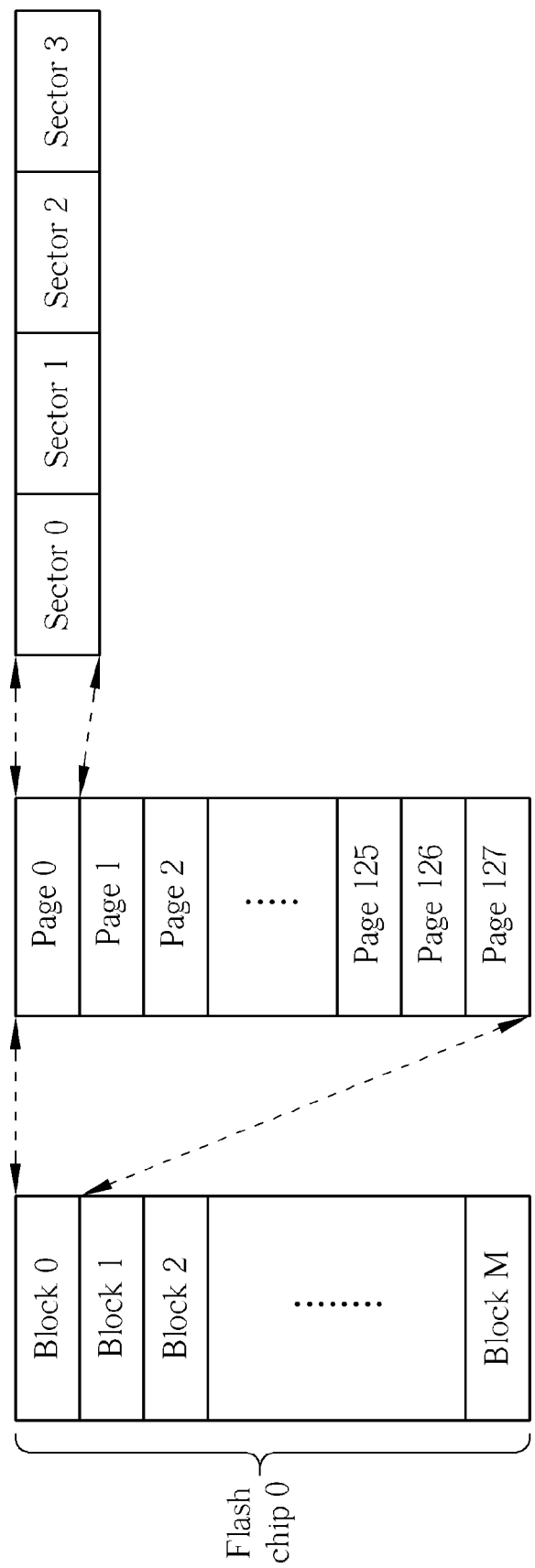
FIG. 6 illustrates an arrangement of one of the NV memory elements shown in FIG. 1 according to an embodiment of the present invention, where the NV memory element of this embodiment is a flash chip.
Figure 7A:
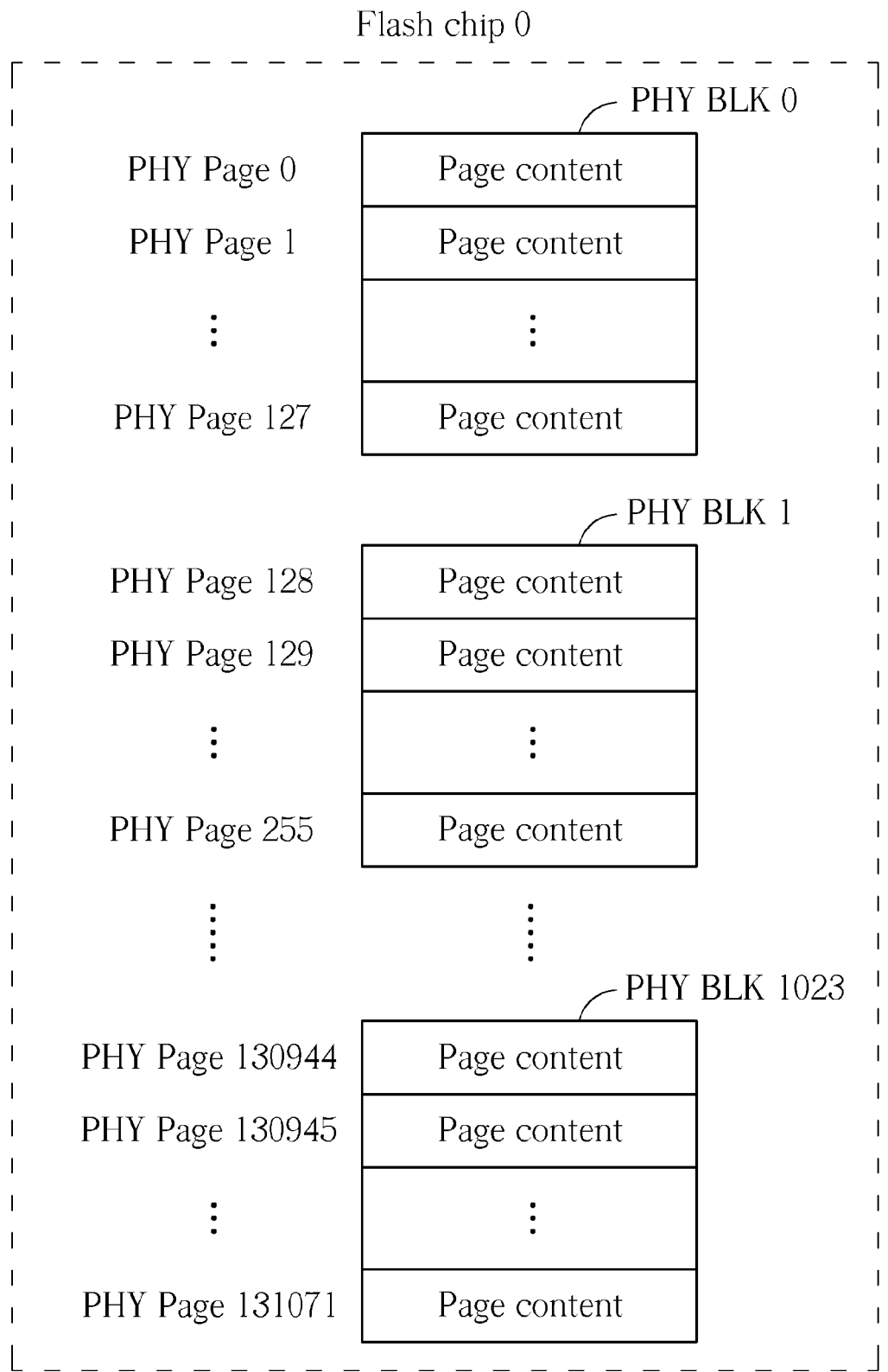
FIGS. 7A-7D illustrate physical addresses of the NV memory elements shown in FIG. 1 according to an embodiment of the invention, where the NV memory elements of this embodiment are a plurality of flash chips.
Figure 7B:
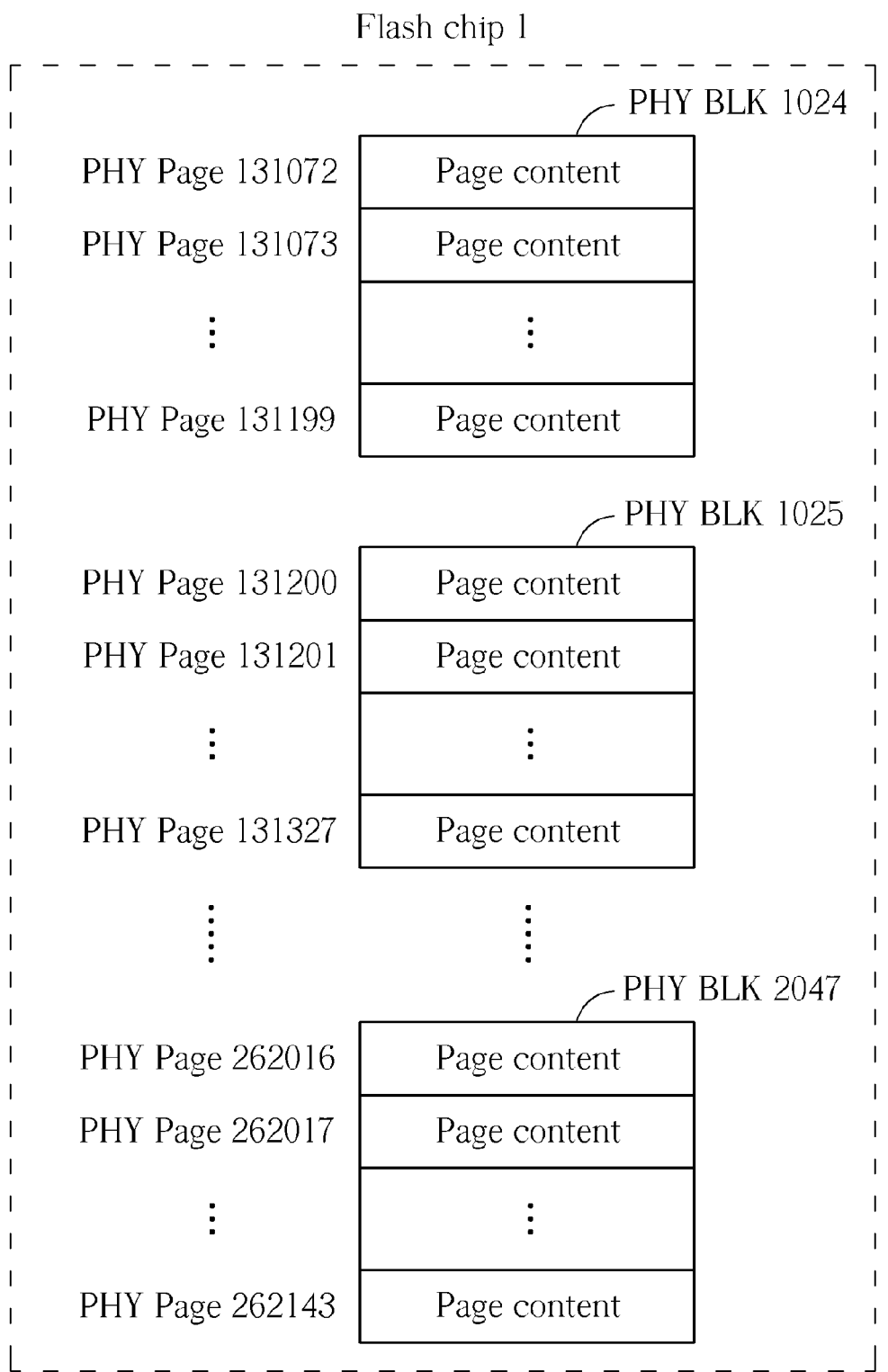
Figure 7C:
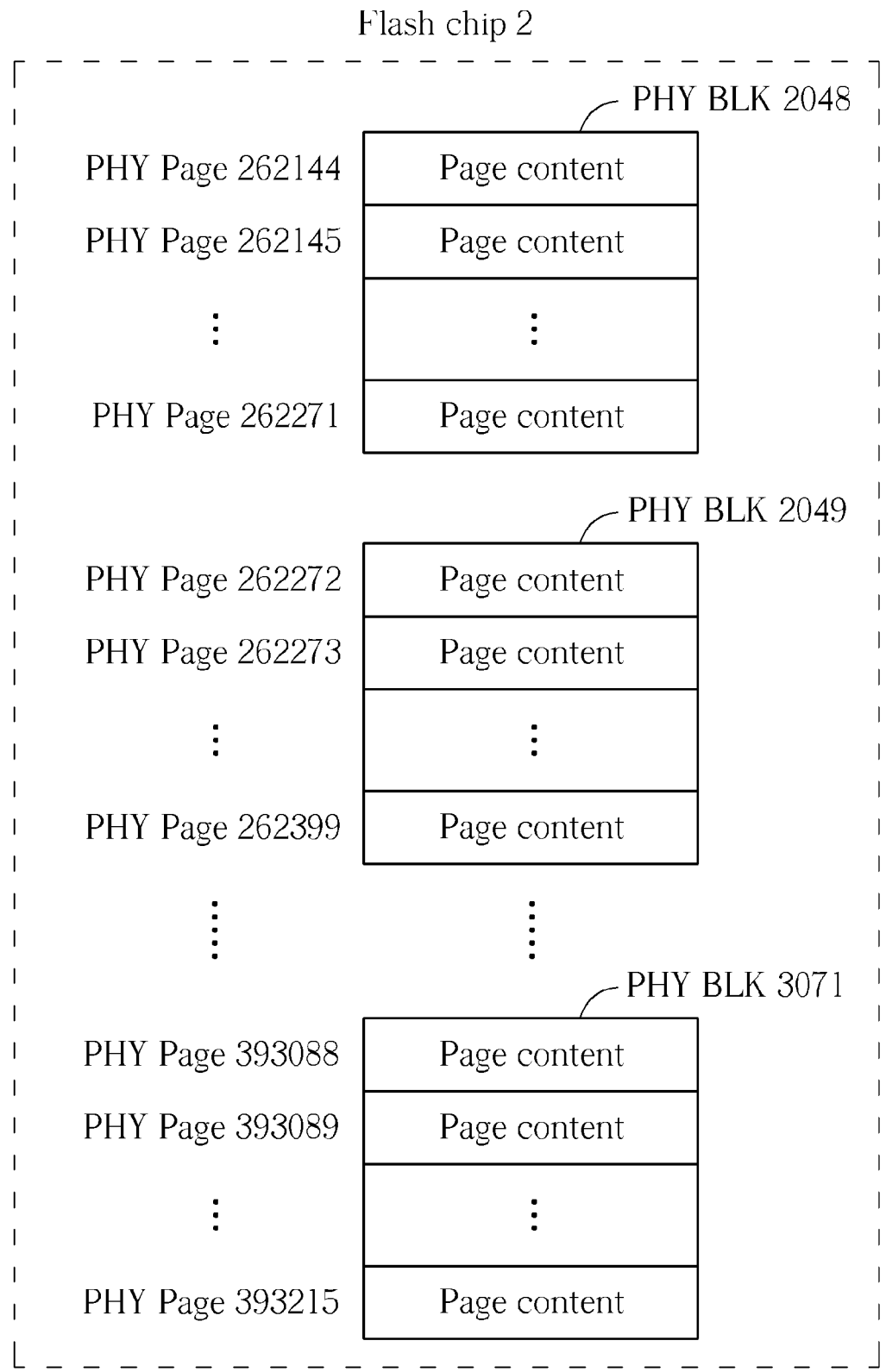
Figure 7D:
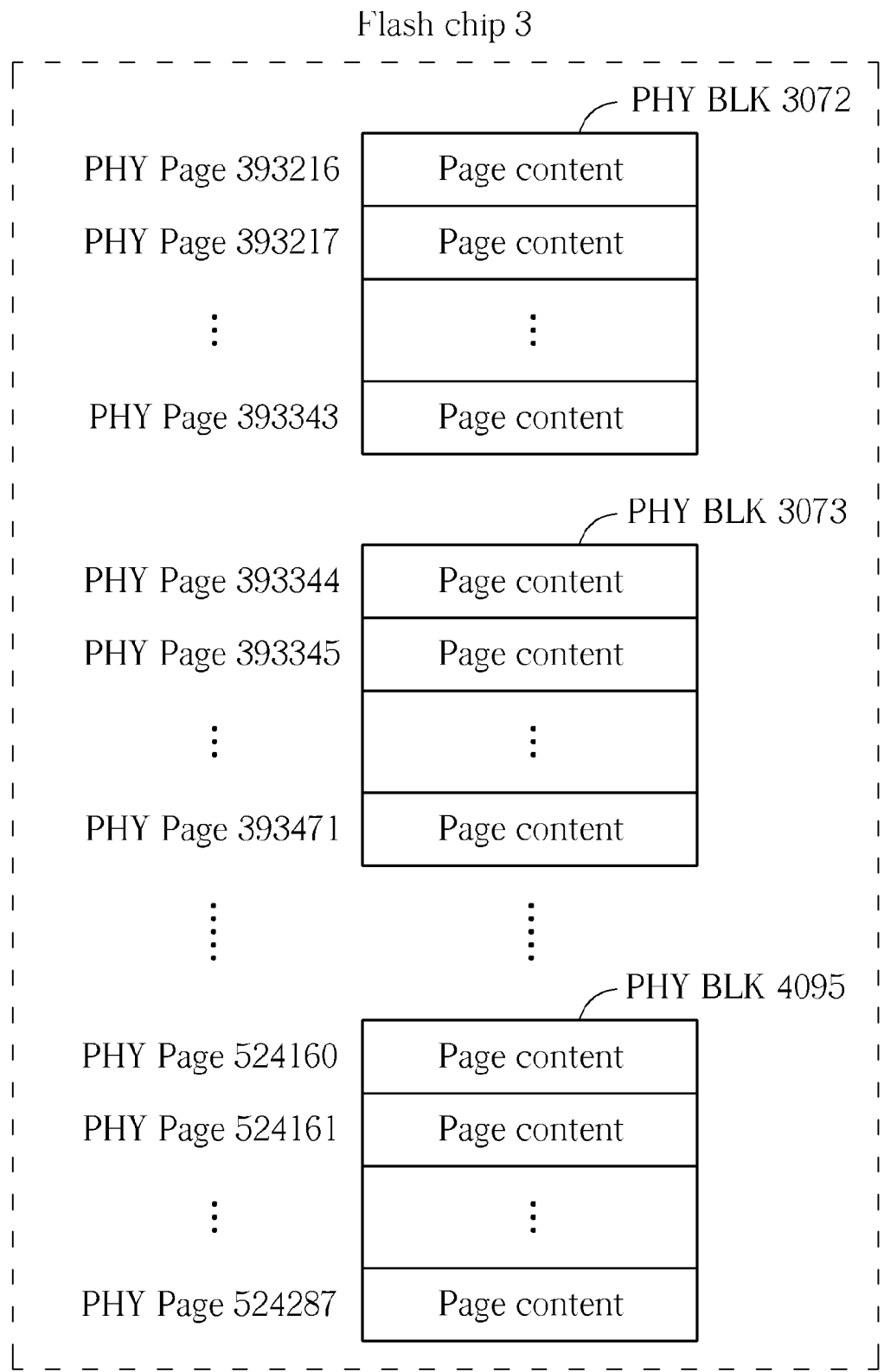

FIG. 6 illustrates an arrangement of the NV memory element 140_0 according to an embodiment of the present invention, where the NV memory element 140_0 of this embodiment is referred to as the flash chip 0 as mentioned above. As shown in FIG. 6, a page comprises a plurality of sectors, e.g. sectors 0, 1, 2, and 3. A sector is the minimal read unit, which can be 512 bytes in this embodiment. In other words, the processing unit 110 can read one sector or a plurality of sectors during a reading operation.

FIGS. 7A-7D illustrate the physical addresses of the flash chips 0, 1, . . . , and N according to an embodiment of the invention, where N=3 and M=1023 in this embodiment. As the physical addresses of this embodiment may fall within a range that is wider than the range [0x0000, 0xFFFF] utilized in some embodiments disclosed above, the physical addresses are illustrated with the decimal numeral system hereinafter for simplicity. This is for illustrative purposes only, and is not meant to be a limitation of the present invention. According to a variation of this embodiment, the physical addresses can be illustrated with the hexadecimal numeral system, where the physical addresses may have more digits than those in some embodiments disclosed above. According to another variation of this embodiment, the physical addresses can be illustrated with another numeral system when needed.

Regarding the physical block addresses, the first block of the flash chip 0 is regarded as the first block of the flash chips 0-3, and is addressed as the physical block address 0, and therefore, can be referred to as PHY BLK 0, where "PHY BLK" stands for "physical block". The last block of the flash chip 0 is regarded as the 1024$^{th}$ block of the flash chips 0-3, and is addressed as the physical block address 1023, and therefore, can be referred to as PHY BLK 1023. The first block of the flash chip 1 is regarded as the 1025$^{th}$ block of the flash chips 0-3, and is addressed as the physical block address 1024, and therefore, can be referred to as PHY BLK 1024, and so on. The last block of the flash chip 3 is regarded as the 4096$^{th}$ block of the flash chips 0-3, and is addressed as the physical block address 4095, and therefore, can be referred to as PHY BLK 4095. In this embodiment, the blocks of the flash chips 0-3 comprise 4 sets of PHY BLKs {0, 1, . . . ,

1023}, {1024, 1025, ..., 2047}, {2048, 2049, ..., 3071}, and {3072, 3073, ..., 4095}, i.e. 4096 PHY BLKs in total.

Regarding the physical page addresses, the first page of PHY BLK 0 is regarded as the first page of the flash chips 0-3, and is addressed as the physical page address 0, and therefore, can be referred to as PHY Page 0. The last page of PHY BLK 0 is regarded as the $128^{th}$ page of the flash chips 0-3, and is addressed as the physical page address 127, and therefore, can be referred to as PHY Page 127. The first page of PHY BLK 1 is regarded as the $129^{th}$ page of the flash chips 0-3, and is addressed as the physical page address 128, and therefore, can be referred to as PHY Page 128, and so on. The last page of PHY BLK 4095 is regarded as the $524288^{th}$ page of the flash chips 0-3, and is addressed as the physical page address 524287, and therefore, can be referred to as PHY Page 524287. In this embodiment, the pages of the flash chips 0-3 comprise 4096 sets of PHY Pages {0, 1, ..., 127}, {128, 129, ..., 255}, ..., and {524160, 524161, ..., 524287}, i.e. 524288 PHY Pages in total.

Figure 8:
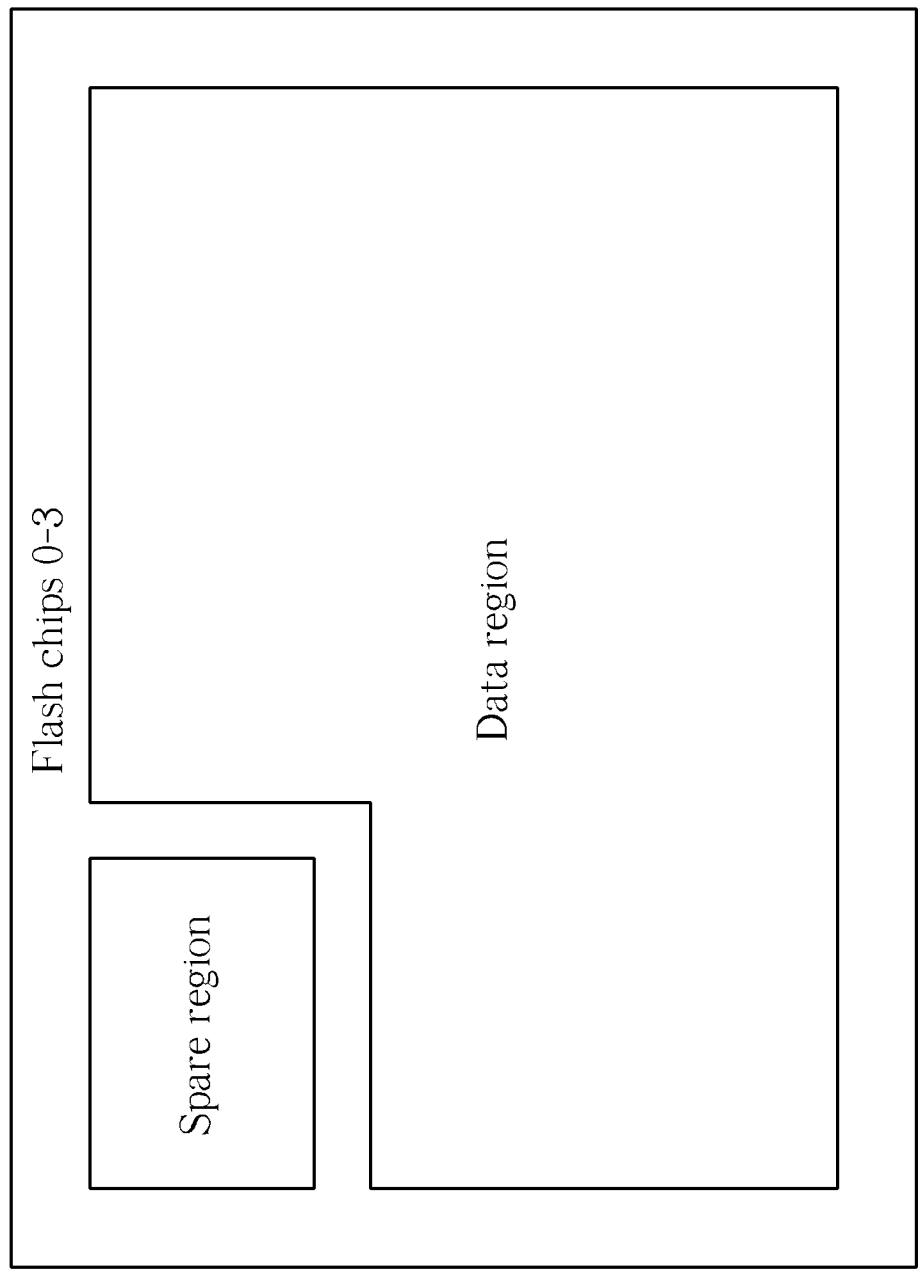
FIG. 8 illustrates a data region and a spare region for managing the flash chips shown in FIGS. 7A-7D.

FIG. 8 illustrates a data region and a spare region for managing the flash chips 0-3 shown in FIGS. 7A-7D. As shown in FIG. 8, the flash chips 0-3 are logically divided into the data region and the spare region. The data region is utilized for storing data, and may initially comprise PHY BLKs 2, 3, ..., and 4095. The spare region is utilized for writing new data, where the spare region typically comprises erased blocks, and may initially comprise PHY BLKs 0 and 1. After a lot of accessing operations, the spare region may logically comprise a different set of physical blocks, and the data region may logically comprise the other physical blocks. For example, after a lot of accessing operations, the spare region may comprise PHY BLKs 4094 and 4095, and the data region may comprise PHY BLKs 0-4093. In another embodiment, the spare region may comprise PHYs BLK 0, 1024, 2048, and 3096, i.e. each of the flash chips 0-3 comprises at least a block logically belonging to the spare region. Please note that the number of blocks of the data region and the number of blocks of the spare region can be determined based upon user/designer requirements. For example, the spare region may comprise 4 PHY BLKs, and the data region may comprise 4092 PHY BLKs.

During writing/programming operations, the host sends a command C0 to the memory apparatus 100 in order to write 4 sectors of data, $D_{S0}$-$D_{S3}$, at corresponding host addresses 0000008-0000011. The volatile memory 120 temporarily stores data $D_{S0}$-$D_{S3}$. The processing unit 110 parses the command C0 to execute the writing/programming operation corresponding to the command C0. The processing unit 110 transfers the host addresses 0000008-0000011 into associated logical addresses. The processing unit 110 divides the host address 0000008 by the number of sectors of a page, i.e. 4 in this embodiment, and obtains a quotient 2 and a remainder 0. The quotient 2 means that the logical page address thereof is 2, and therefore, the logical page indicated by the logical page address 2 can be referred to as LOG Page 2. In addition, the remainder 0 means that the data $D_{S0}$ should be stored in a first sector of a page. The processing unit 110 further divides the host address 0000008 by the number of sectors of a block, i.e. 512 in this embodiment, and obtains a quotient 0 and a remainder 8. The quotient 0 means that the logical block address thereof is 0, and therefore, the logical block indicated by the logical block address 0 can be referred to as LOG BLK 0, where "LOG BLK" stands for "logical block".

In practice, when the host address is expressed with the binary numeral system, the dividing operations can be performed by truncating a portion of bits of the host address. For example, when dividing the host address 0000008 by 4, the processing unit 110 extracts the last two bits (i.e. two adjacent/continuous bits including the least significant bit (LSB)) from the binary expression of the host address to obtain the remainder 0, and extracts the other bits from this binary expression to obtain the quotient 2. In addition, when dividing the host address 0000008 by 512, the processing unit 110 can extract the last nine bits (i.e. nine adjacent/continuous bits including the LSB) from the binary expression of the host address to obtain the remainder 8, and extract the other bits from this binary expression to obtain the quotient 0. Therefore, in this embodiment, the host address 0000008 substantially comprises the logical page address 2 and the logical block address 0. Please note that, as the host address 0000008 inherently belongs to LOG Page 2 and inherently belongs to LOG BLK 0, the processing unit 110 of a variation of this embodiment can parse the host address 0000008 by bit-shifting, rather than really performing the dividing operations.

Similarly, the processing unit 110 of this embodiment determines that the logical page addresses of the host addresses 0000009, 0000010, and 0000011 are all 2 (i.e. all of the host addresses 0000009, 0000010, and 0000011 inherently belong to LOG Page 2, or comprise the logical page address 2), and the logical block addresses thereof are all 0 (i.e. all of the host addresses 0000009, 0000010, and 0000011 further inherently belong to LOG BLK 0, or comprise the logical block address 0). In addition, the data $D_{S1}$, $D_{S2}$, and $D_{S3}$ should be respectively stored in the second, the third, and the fourth sectors of a page.

In this embodiment, PHY BLK 0 is erased and is logically positioned in the spare region initially, the processing unit 110 pops the PHY BLK 0 from the spare region, and writes/programs the data $D_{S0}$-$D_{S3}$ into the first, the second, the third, and the fourth sectors of PHY Page 0, respectively. The processing unit 110 further records 0 in the third field of the global page address linking table of this embodiment, in order to indicate that LOG Page 2 links to PHY Page 0. FIGS. 9A-9D respectively illustrate exemplary versions of the global page address linking table of this embodiment. The arrangement of the illustrative table locations of this embodiment is similar to that of FIGS. 3A-3F, and therefore, is not explained in detail for simplicity. Referring to the global page address linking table shown in FIG. 9A, the physical page address 0 has been written in the third field, which indicates that LOG Page 2 links to PHY Page 0. Alternatively, the physical page address 0 can be written in a corresponding field of a temporary local page address linking table thereof for indicating the linking relationship of the logical and physical addresses. Then, the global page address linking table can be updated accordingly. The implementation details of updating the global page address linking table according to the temporary local page address linking table are similar to those of the embodiments mentioned above. For simplicity, the following embodiments only illustrate that the global page address linking table is updated for reflecting a new logical-to-physical page address linking relationship, however, those skilled in the art will appreciate that the temporary local page address linking table can be updated for reflecting the new logical-to-physical page address linking relationship when obtaining the teachings disclosed in the embodiments of the invention. Therefore, related descriptions are omitted.

In addition, the processing unit 110 records usage information during accessing the pages. For example, the usage information comprises a valid page count table for recording valid page counts of the blocks, respectively. This is for illustrative purposes only, and is not meant to be a limitation of the present invention. According to a variation of this embodiment, the usage information comprises an invalid page count table for recording invalid page counts of the blocks, respectively. In practice, as each fully programmed block comprise a predetermined number of pages (e.g. 128 pages in this embodiment), the valid page count and the invalid page count of the same fully programmed block are complementary to each other.

According to this embodiment, the processing unit 110 records 1 in the first field of the valid page count table, in order to indicate that PHY BLK 0 contains 1 valid page (i.e. 1 page of useful data; or in other words, 1 page of valid data). Please note that the global page address linking table and the valid page count table can be stored in the volatile memory 120. In this way, the global page address linking table and the valid page count table can be updated easily during accessing the flash chips. This is for illustrative purposes only, and is not meant to be a limitation of the present invention. According to a variation of this embodiment, the global page address linking table and the valid page count table can be loaded from the volatile memory 120 and stored in one or more of the NV memory elements 140_0, 140_1, . . . , and 140_N before shutting down the memory apparatus 100. More particularly, the global page address linking table and the valid page count table can be stored in one or more link blocks of the NV memory elements 140_0, 140_1, . . . , and 140_N. In this way, the global page address linking table and the valid page count table can be preserved while the memory apparatus 100 shuts down. Each of the one or more link blocks is a particular block for preserving system information. While turning on the memory apparatus 100 next time, the global page address linking table and the valid page count table can be easily obtained from the link block(s).

Next, the host sends a command C1 to the memory apparatus 100 in order to write 4 sectors of data, $D_{S4}$-$D_{S7}$, into corresponding host addresses 0000512-0000515. Similarly, the processing unit 110 determines that the logical page addresses of the host addresses 0000512-0000515 are all 128 (i.e. all of the host addresses 0000512-0000515 belong to LOG Page 128, or comprise the logical page address 128), and the logical block addresses thereof are all 1 (i.e. all of the host addresses 0000512-0000515 further belong to LOG BLK 1, or comprise the logical block address 1). In addition, the data $D_{S4}$-$D_{S7}$ should be stored in the first, the second, the third, and the fourth sectors of a page, respectively. Since PHY Page 0 has been programmed, the processing unit 110 writes/programs the data $D_{S4}$-$D_{S7}$ into the first, the second, the third, and the fourth sectors of PHY Page 1 (which is the page subsequent to PHY Page 0), respectively. The processing unit 110 further records 1 in the $129^{th}$ field of the global page address linking table shown in FIG. 9A, in order to indicate that LOG Page 128 links to PHY Page 1. In addition, the processing unit 110 records 2 in the first field of the valid page count table (i.e. the processing unit 110 updates the first field thereof with 2), in order to indicate that PHY BLK 0 contains 2 valid pages (i.e. 2 pages of valid data). That is, the processing unit 110 increases the valid page count of PHY BLK 0. This is for illustrative purposes only, and is not meant to be a limitation of the present invention. In a situation where the valid page count table is replaced by the invalid page count table mentioned above, the processing unit 110 maintains a value of an invalid page count of PHY BLK 0.

Please note that the host addresses 0000512-0000515 and the host addresses 0000008-0000011 belong to different logical block (e.g. the host addresses 0000512-0000515 belong to LOG BLK 1, and the host addresses 0000008-0000011 belong to LOG BLK 0), however, these host addresses all link to the associated pages in the same physical blocks, and data corresponding to the host addresses 0000512-0000515 and data corresponding to the host addresses 0000008-0000011 are both programmed/written in the same physical block, i.e. PHY BLK 0 in this embodiment.

In the above situation, when a first set of host addresses (e.g. the host addresses 0000512-0000515) belong to a first logical block (e.g. LOG BLK 1) and a second set of host addresses (e.g. the host addresses 0000008-0000011) belong to a second logical block (e.g. LOG BLK 0), the processing unit 110 can program/write both the data corresponding to the first set of host addresses and the data corresponding to the second set of host addresses in the same physical block (e.g. PHY BLK 0). This is for illustrative purposes only, and is not meant to be a limitation of the present invention. According to a variation of this embodiment, when a first set of host addresses belong to a first logical block, the processing unit 110 can program/write a first portion and a second portion of the data corresponding to the first set of host addresses in different physical blocks wherein the first portion and the second portion of the data are not overlap.

In this embodiment, the host then sends a command C2 to the memory apparatus 100 in order to write 4 sectors of data, $D_{S8}$-$D_{S11}$, into corresponding host addresses 0000004-0000007. Similarly, the processing unit 110 determines that the logical page addresses of the host addresses 0000004-0000007 are all 1 (i.e. all of the host addresses 0000004-0000007 belong to LOG Page 1, or comprise the logical page address 1), and the logical block addresses thereof are all 0 (i.e. all of the host addresses 0000004-0000007 further belong to LOG BLK 0, or comprise the logical block address 0). In addition, the data $D_{S8}$-$D_{S11}$ should be stored in the first, the second, the third, and the fourth sectors of a page, respectively. Since PHY Page 1 has been programmed, the processing unit 110 writes/programs the data $D_{S8}$-$D_{S11}$ into the first, the second, the third, and the fourth sectors of PHY page 2 (which is the page subsequent to PHY Page 1), respectively. The processing unit 110 further records 2 in the second field of the global page address linking table shown in FIG. 9A, in order to indicate that LOG Page 1 links to PHY Page 2. In addition, the processing unit 110 records 3 in the first field of the valid page count table (i.e. the processing unit 110 updates the first field thereof with 3), in order to indicate that PHY BLK 0 contains 3 valid pages (i.e. 3 pages of valid data). That is, the processing unit 110 increases the valid page count of PHY BLK 0. This is for illustrative purposes only, and is not meant to be a limitation of the present invention. In the situation where the valid page count table is replaced by the invalid page count table mentioned above, the processing unit 110 maintains the value of the invalid page count of PHY BLK 0.

Figure 9A:
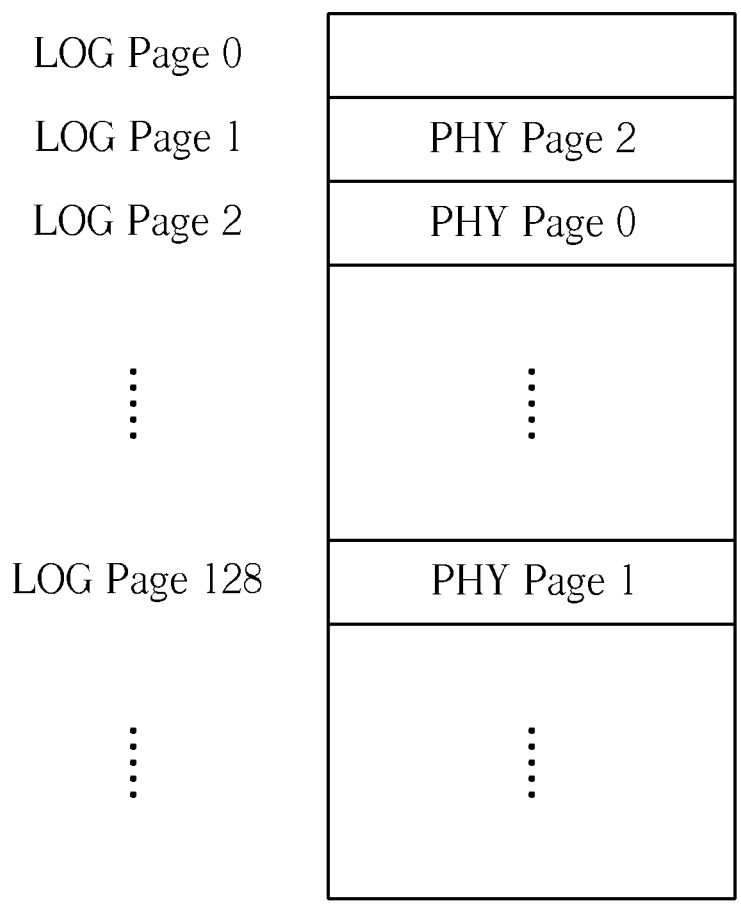
FIGS. 9A-9D respectively illustrate exemplary versions of a global page address linking table of the embodiment shown in FIGS. 7A-7D.
Figure 10A:
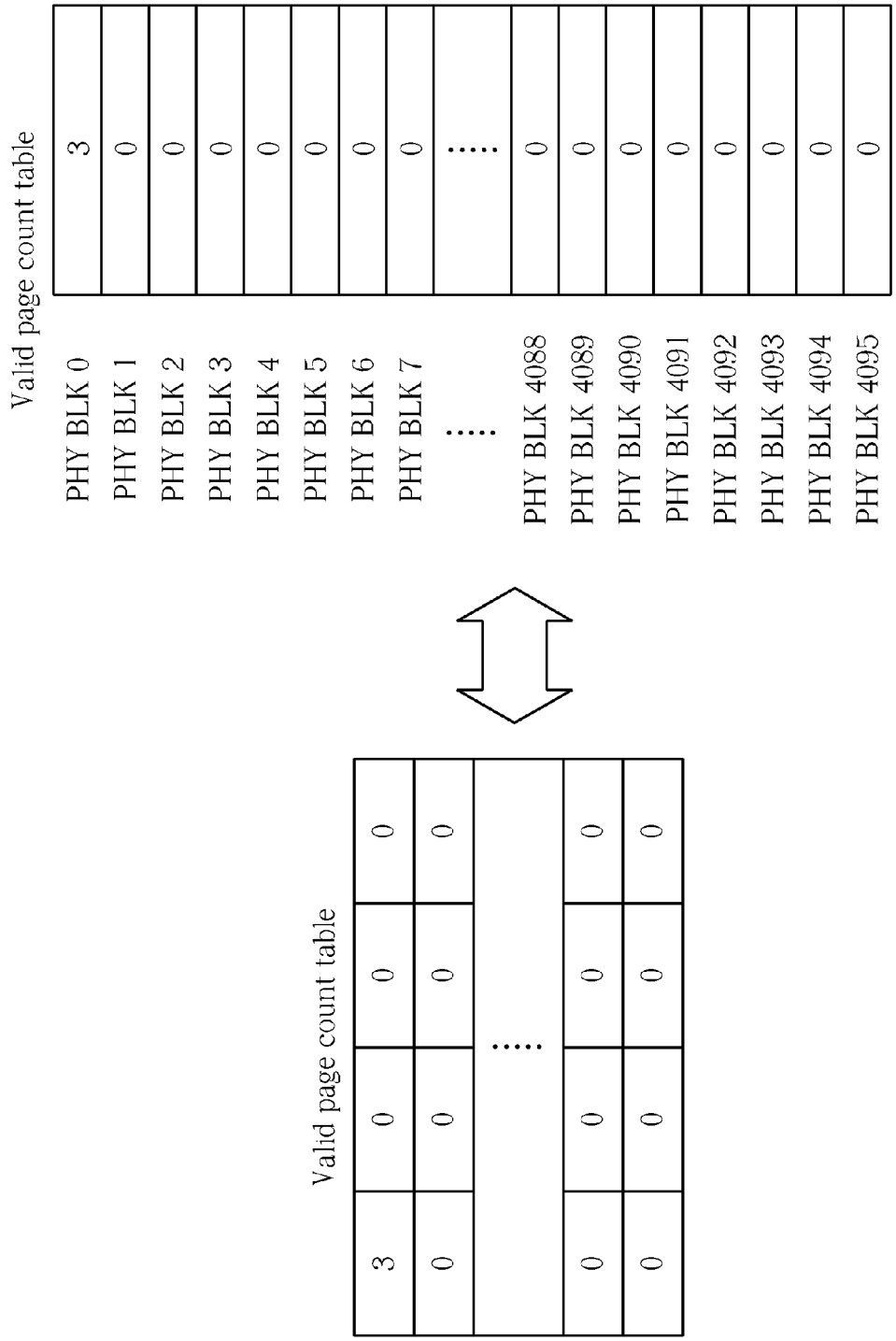

FIGS. 10A-10F respectively illustrate exemplary versions of the valid page count table of this embodiment. Referring to the left half of FIG. 10A first, the ranking of a field of the valid page count table represents a physical block address, and the content of this field represents an associated valid page count. For example, given that $i_{PBLK}$ and $i_{PBLK}$ are respectively the row number and the column number of the illustrative table location ($i_{PBLK}$, $j_{PBLK}$) of the valid page count table and $i_{PBLK}$=0, 1, . . . , etc. and $i_{PBLK}$=0, 1, . . . , etc. in this embodiment, the illustrative table location ($i_{PBLK}$, $j_{PBLK}$) corresponding to the ($i_{PBLK}$*4+$j_{PBLK}$)$^{th}$ field represents a physical block address ($i_{PBLK}$*4+$j_{PBLK}$). This is for illustrative purposes only, and is not meant to be a limitation of the present invention. For better comprehension, the valid page count table can be illustrated as a single column, as shown in the right half of FIG. 10A. Given that $i_{PBLK}$ is still the row number and $i_{PBLK}$=0, 1, . . . , etc., within this 1-D array illustration of the valid page count table, the illustrative table location $i_{PBLK}$ corresponding to the $i_{PBLK}^{th}$ field represents a physical block address ($i_{PBLK}$). As a result of executing command C2 in this embodiment, the global page address linking table and the valid page count table are updated as shown in FIGS. 9A and 10A, respectively.

Subsequently, the host sends a command C3 to the memory apparatus 100 in order to write/update 4 sectors of data, $D_{S0}'$-$D_{S3}'$, into corresponding host addresses 0000008-00000011. Similarly, the processing unit 110 determines that the logical page addresses of the host addresses 0000008-00000011 are all 2 (i.e. all of the host addresses 0000008-0000011 belong to LOG Page 2, or comprise the logical page address 2), and the logical block addresses thereof are all 0 (i.e. all of the host addresses 0000008-0000011 further belong to LOG BLK 0, or comprise the logical block address 0). In addition, the data $D_{S0}'$-$D_{S3}'$ should be stored in the first, the second, the third, and the fourth sectors of a page, respectively. Since PHY Page 2 has been programmed, the processing unit 110 writes/programs the data $D_{S0}'$-$D_{S3}'$ into the first, the second, the third, and the fourth sectors of PHY page 3 (which is the page subsequent to PHY Page 2), respectively. The processing unit 110 further records/updates 3 in the third field of the global page address linking table shown in FIG. 9B, in order to indicate that LOG Page 2 links to PHY Page 3 now. In addition, the processing unit 110 still records 3 in the first field of the valid page count table shown in FIG. 10B, in order to indicate that PHY BLK 0 still contains 3 valid pages. That is, the processing unit 110 maintains the value 3 of the valid page count of PHY BLK 0. This is for illustrative purposes only, and is not meant to be a limitation of the present invention. In the situation where the valid page count table is replaced by the invalid page count table mentioned above, the processing unit 110 increases the invalid page count of PHY BLK 0.

Figure 9B:
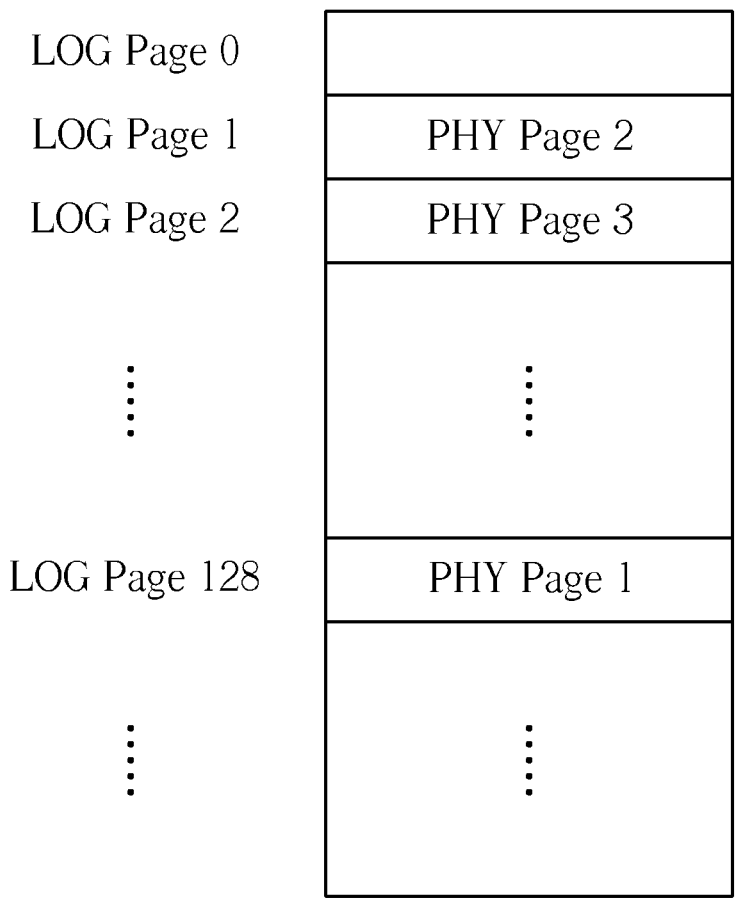

Although 4 pages, PHY Pages 0-3, have been programmed in PHY BLK 0, only 3 physical pages, PHY Page 1-3, contain valid data. Since data of LOG Page 2 has been updated, PHY Page 0 does not contain valid data and can be deemed as an invalid page containing invalid data. As a result of executing command C3, the global page address linking table and the valid page count table are updated as shown in FIGS. 9B and 10B, respectively.

Figure 9C:
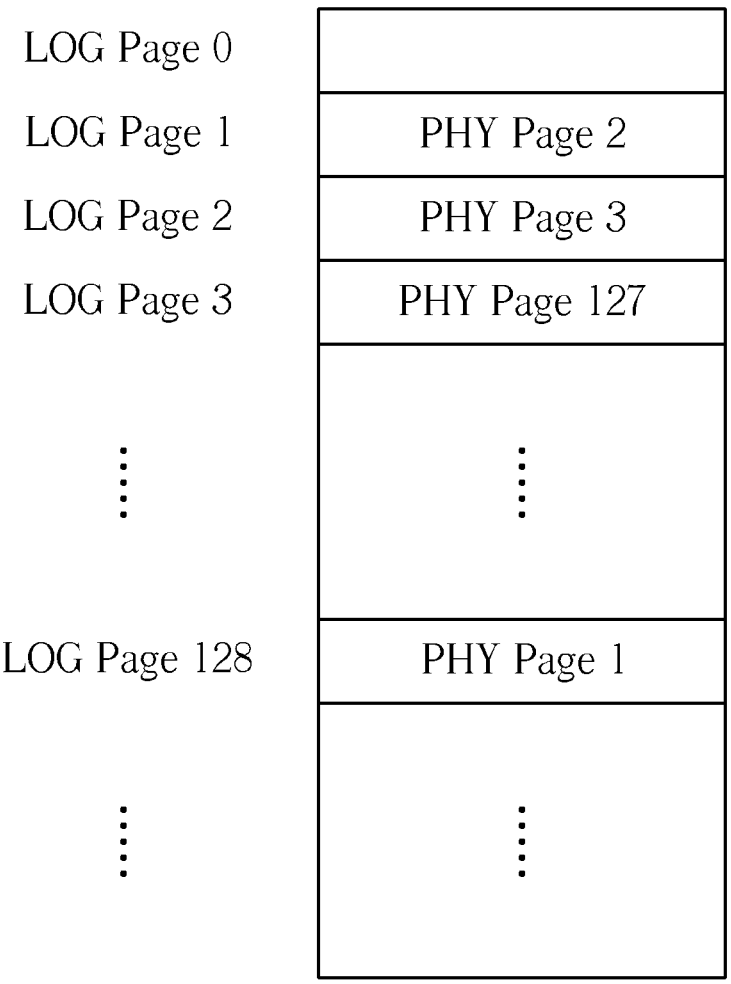

In this embodiment, referring to FIGS. 9C and 10C, assume that after several writing/programming operations are further performed, all pages of the PHY BLK 0 have been programmed, and the valid page count of the PHY BLK 0 is 100. The host sends a command C4 to the memory apparatus 100 in order to write/update 4 sectors of data, $D_{S0}''$-$D_{S3}''$, into corresponding host addresses 0000008-00000011. Similarly, the processing unit 110 determines that the logical page addresses of the host addresses 0000008-00000011 are all 2 (i.e. all of the host addresses 0000008-0000011 belong to LOG Page 2, or comprise the logical page address 2), and the logical block addresses thereof are all 0 (i.e. all of the host addresses 0000008-0000011 further belong to LOG BLK 0, or comprise the logical block address 0). In addition, the data $D_{S0}''$-$D_{S3}''$ should be stored in the first, the second, the third, and the fourth sectors of a page, respectively. Since all pages of the PHY BLK 0 have been programmed, the processing unit 110 writes/programs the data $D_{S0}''$-$D_{S3}''$ into the first, the second, the third, and the fourth sectors of PHY page 128 (which is the page subsequent to PHY Page 127), respectively. The processing unit 110 further records/updates 128 in the third field of the global page address linking table shown in FIG. 9D, in order to indicate that LOG Page 2 links to PHY Page 128 now. Here, PHY Page 3 does not contain valid data and can be deemed as an invalid page containing invalid data. In addition, the processing unit 110 records 1 in the second field of the valid page count table to indicate that PHY BLK 1 contains 1 valid page (i.e. 1 page of valid data), and records/updates 99 in the first field of the valid page count table to indicate that PHY BLK 0 contains 99 valid pages (i.e. 99 pages of valid data) now. That is, the processing unit 110 decreases the valid page count of PHY BLK 0. This is for illustrative purposes only, and is not meant to be a limitation of the present invention. In the situation where the valid page count table is replaced by the invalid page count table mentioned above, the processing unit 110 increases the invalid page count of PHY BLK 0.

Figure 9D:
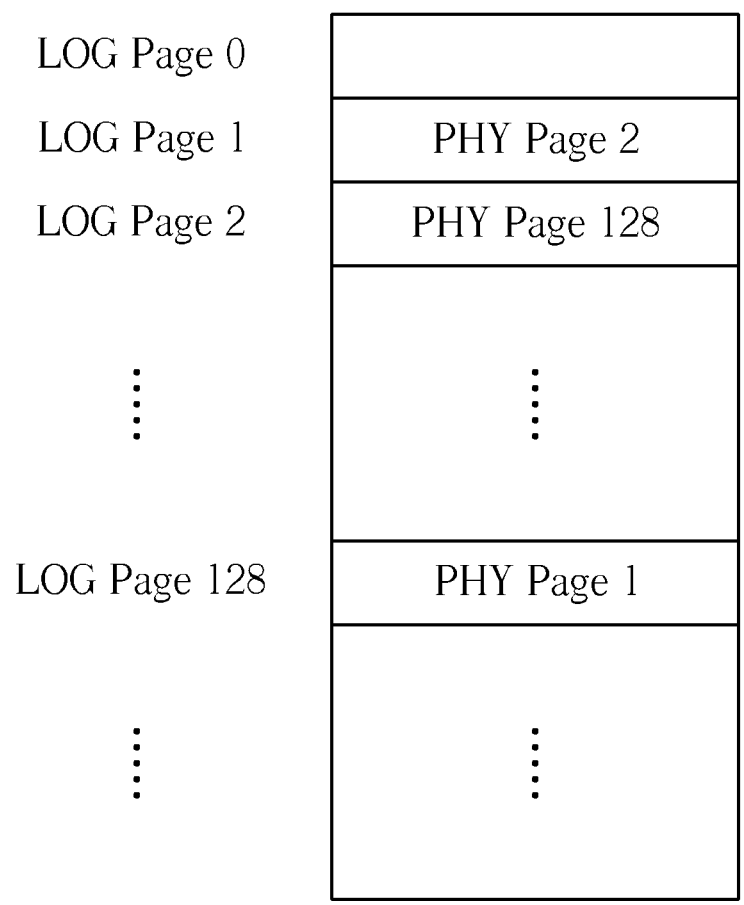

As a result of executing command C4, the global page address linking table and the valid page count table are updated as shown in FIGS. 9D and 10D, respectively.

Next, the host sends a command C5 to the memory apparatus 100 in order to read 4 sectors of data corresponding host addresses 0000008-00000011. The processing unit 110 parses the command C5 to execute the reading operation. The processing unit 110 transfers the host addresses 0000008-0000011 into logical addresses. The processing unit 110 divides the host address 0000008 by the number of sectors of a page, i.e. 4 in this embodiment, and obtains a quotient 2 and a remainder 0. The quotient 2 means that the logical page address thereof is 2, where the logical page indicated by the logical page address 2 is LOG Page 2. In addition, the remainder 0 means that the data $D_{S0}$ should have been stored in the first sector of a page. Similarly, the processing unit 110 determines that the logical page addresses of the host addresses 0000009, 0000010, and 0000011 are all 2 (i.e. all of the host addresses 0000009, 0000010, and 0000011 belong to LOG Page 2, or comprise the logical page address 2), and the logical block addresses thereof are all 0 (i.e. all of the host addresses 0000009, 0000010, and 0000011 further belong to LOG BLK 0, or comprise the logical block address 0). In addition, the data corresponding to host addresses 0000008-00000011 should have been stored in the first, the second, the third, and the fourth sectors of a page, respectively. The processing unit 110 reads the third field of the global page address linking table and obtains 128, which indicates that the data corresponding to LOG Page 2 is stored in PHY Page 128. The processing unit 110 reads PHY Page 128 to obtain data $D_{S0}''$-$D_{S3}''$, and sends these data to the host.

In this embodiment, assume that after a lot of writing/programming operations are further performed, all blocks of the data region (e.g. PHY BLKs 0-4093) have been fully programmed, and the spare region comprises PHY BLKs 4094 and 4095, where the valid page count table is illustrated in FIG. 10E. Then, the host sends a command C6 to the memory apparatus 100 in order to write 4 sectors of data, $D_{S12}$-$D_{S15}$. The processing unit 110 pops a physical block from the spare region, such as PHY BLK 4094, for writing data $D_{S12}$-$D_{S15}$. In general, it is suggested to maintain a sufficient block count of the spare region. For example, the minimal block count should be always greater than zero. In another example, the minimal block count should be greater than zero for most of the time, where the minimal block count can temporarily reach zero as long as the operations of the memory apparatus 100 will not be hindered.

Assuming that maintaining a sufficient block count of the spare region is required in this embodiment, in a situation where the block count of the spare region is (or will be) less than a predetermined value (e.g. the predetermined value is 2), the processing unit 110 has to erase a physical block in the data region, in order to push this erased physical block into the spare region. The processing unit 110 searches the valid page count table and finds out that PHY BLK 2 has no valid data since the valid page count of PHY BLK 2 is 0. Since, PHY BLK 2 having the least valid page count, the processing unit 110 erases the PHY BLK 2 and then pushes the erased PHY BLK 2 into the spare region. Thus, the spare region comprises PHY BLKs 2 and 4095 now. This is for illustrative purposes only, and is not meant to be a limitation of the present invention. According to a variation of this embodiment, when the valid page count of PHY BLK 2 decreases to zero, the processing unit 110 can erase PHY BLK 2 immediately.

According to this embodiment, assume that after several writing/programming operations are further performed, all pages of the PHY BLK 4094 have been programmed, where the valid page count table is illustrated in FIG. 10F. Then, the host sends a command C7 to the memory apparatus 100 in order to write 4 sectors of data, $D_{S16}$-$D_{S19}$. The processing unit 110 pops a physical block from the spare region, such as PHY BLK 4095, for writing data $D_{S16}$-$D_{S19}$.

Similarly, when it is detected that the block count of the spare region is (or will be) less than the predetermined value, the processing unit 110 has to erase at least a physical block in the data region in order to push the physical block(s) into the spare region. The processing unit 110 of this embodiment searches the valid page count table shown in FIG. 10F and finds out that PHY BLK 0 has 40 pages of valid data and PHY BLK 1 has 50 pages of valid data, where PHY BLKs 0 and 1 have the least valid page counts among others. In this embodiment, the processing unit 110 moves the valid data of PHY BLKs 0 and 1 into PHY BLK 2, and updates the global page address liking table to reflect the movement of the valid data. In other words, the processing unit 110 reads the valid data in PHY BLKs 0 and 1, programs/writes the valid data into PHY BLK 2, and links the logical page addresses of the valid data to the physical pages programmed/written with the valid data, correspondingly. After moving the valid data, the processing unit 110 erases PHY BLKs 0 and 1, and pushes the erased PHY BLKs 0 and 1 into the spare region.

In this embodiment, when it is detected that the block count of the spare region is less than the predetermined value, the processing unit 110 typically searches the valid page count table to find one or more fully programmed blocks having the least valid page count(s), and erases the one or more fully programmed blocks in order to push the one or more blocks into the spare region. This is for illustrative purposes only, and is not meant to be a limitation of the present invention. According to a variation of this embodiment, in a situation where the valid page count table is replaced by the invalid page count table mentioned above, the processing unit 110 can search the invalid page count table to find one or more fully programmed blocks having the most invalid page count(s), and erase the one or more fully programmed blocks of this variation in order to push the one or more blocks into the spare region.

According to this embodiment, the processing unit 110 has popped one more physical block from the spare region into the data region, such as PHY BLK 2, for merging PHY BLKs 0 and 1. This is for illustrative purposes only, and is not meant to be a limitation of the present invention. According to a variation of this embodiment, the processing unit 110 can merge the one or more fully programmed blocks having the least valid page count(s) into a partially programmed block as long as there are enough free pages in the partially programmed block, where the free pages represent the pages that have not been programmed since the latest erasure of the block comprising these valid pages. For example, the processing unit 110 can merge PHY BLKs 0 and 1 into the partially programmed block, such as PHY BLK 4095, as long as there are enough free pages in the partially programmed block for programming data $D_{S16}$-$D_{S19}$ and the valid data of PHY BLKs 0 and 1. In another example, the processing unit 110 can merge PHY BLK 0 into the partially programmed block, such as PHY BLK 4095, as long as there are enough free pages in the partially programmed block for programming data $D_{S16}$-$D_{S19}$ and the valid data of PHY BLK 0.

In practice, the processing unit 110 can program/write the data $D_{S16}$-$D_{S19}$ into PHY BLK 4095, and can further move the valid data of PHY BLKs 0 and 1 into PHY BLK 4095 as long as there are enough free pages in PHY BLK 4095 for programming data $D_{S16}$-$D_{S19}$ and the valid data. Certainly, the processing unit 110 of this variation updates the global page address liking table to reflect the movement of the valid data. Similarly, after moving the valid data, the processing unit 110 erases PHY BLKs 0 and 1, and pushes the erased PHY BLKs 0 and 1 into the spare region.

In other variations of this embodiment, the processing unit 110 can move valid data of N physical blocks into M physical blocks wherein N and M are positive integers, and N is greater than M. Assume that there are K pages of valid data in total within the N physical blocks, where K is smaller than the number of free pages in total within the M physical blocks. The processing unit 110 can read the K pages of valid data from the N physical blocks, erase the N physical blocks, buffer the K pages of valid data into the volatile memory 120, and program/write the K pages of valid data into the M physical blocks. Please note that, in general, the N physical blocks and the M physical blocks may overlap (e.g. the N physical blocks and the M physical blocks both comprise at least a same physical block) or not overlap. In a situation where the N physical blocks and the M physical blocks do not overlap (i.e. none of the N physical blocks belongs to the M physical blocks, and vice versa), the K pages of valid data can be programmed/written into the M physical blocks without waiting for erasing the N physical blocks, and the processing unit 110 can generate (N-M) erased blocks eventually. Certainly, the processing unit 110 updates the global page address liking table to reflect the movement of the valid data.

Please note that, in other variations of this embodiment, the processing unit 110 can record the invalid page count of each physical block. For example, given that the page count of each physical block is 128, a specific physical block comprises 128 pages, within which 28 pages are invalid pages containing invalid data and 100 pages are valid pages containing valid data. That is, the invalid page count and the valid page count of the specific physical block are 28 and 100, respectively. The processing unit 110 can build an invalid page count table of the flash chips 0-3, and erase a particular physical block according to the invalid page count table. In some of the variations, when the processing unit 110 has to erase a physical block, the processing unit 110 can select a particular physical block having the most invalid pages according to the invalid page count table, and erase the particular physical block. In practice, before the particular physical is erased, the valid data contained therein have to be moved to other blocks. For efficiently moving the valid data, the processing unit 110 can record one or more positions of the valid data in the particular block. More particularly, the processing unit 110 can build a valid-page-position table for each block in order to indicate the position(s) of one or more valid pages containing valid data within the block.

FIG. 11 illustrates a valid-page-position table of the flash chips 0-3 according to an embodiment of the present invention. The arrangement of the illustrative table locations of valid-page-position table is similar to that of FIGS. 10B-10F together with the right half of FIG. 10A, and therefore, is not explained in detail for simplicity. In this embodiment, each field of the valid-page-position table indicates whether any valid-page-position corresponding to an associated physical block exists. For example, each field of this embodiment comprises 128 bits respectively corresponding to the pages of the associated physical block.

In particular, each field of the valid-page-position table indicates the valid-page-position(s) corresponding to the associated physical block. Each bit in a specific field indicates whether an associated page in the associated physical block is valid or invalid. For example, the first field of the valid-page-position table shown in FIG. 11 is recorded as "01011100101 . . . 11111", which indicates the valid-page-position(s) within PHY BLK 0.

More specifically, the ranking of a specific bit in the specific field of the valid-page-position table shown in FIG. 11 represents a page address offset (or a relative page position) of an associated page within the associated physical block. For example, regarding the bits "01011100101 . . . 11111" in the first field of the valid-page-position table shown in FIG. 11, the least significant bit (LSB) "1" indicates that the first page of the PHY BLK 0 (i.e. the PHY Page 0) is a valid page containing valid data, and the most significant bit (MSB) "0" indicates that the last page of the PHY BLK 0 (i.e. the PHY Page 127) is an invalid page containing invalid data, where other bits between LSB and MSB indicate the valid/invalid state of the other physical pages of the associated physical block, respectively. Similar descriptions are not repeated for the other fields of the valid-page-position table shown in FIG. 11. As a result, the processing unit 110 can move valid data contained in the valid pages quickly according to the valid-page-position table.

In this embodiment, the LSB in the specific field indicates whether the first page of the associated physical block is a valid page or an invalid page, and the MSB in the specific field indicates whether the last page of the associated physical block is a valid page or an invalid page. This is for illustrative purposes only, and is not meant to be a limitation of the present invention. According to a variation of this embodiment, the LSB in the specific field indicates whether the last page of the associated physical block is a valid page or an invalid page, and the MSB in the specific field indicates whether the first page of the associated physical block is a valid page or an invalid page. For example, regarding the bits "01011100101 . . . 11111" in the first field, the LSB "1" indicates that the last page of the PHY BLK 0 (i.e. the PHY Page 127) is a valid page containing valid data, and the most significant bit (MSB) "0" indicates that the first page of the PHY BLK 0 (i.e. the PHY Page 0) is an invalid page containing invalid data, where other bits between LSB and MSB indicate the valid/invalid state of the other physical pages of the associated physical block, respectively.

In this embodiment, a logical value "1" of the specific bit indicates that the associated page is a valid page, while a logical value "0" of the specific bit indicates that the associated page is an invalid page. This is for illustrative purposes only, and is not meant to be a limitation of the present invention. According to a variation of this embodiment, the logical value "0" of the specific bit indicates that the associated page is a valid page, while the logical value "1" of the specific bit indicates that the associated page is an invalid page.

In addition, the valid-page-position table can be stored in the volatile memory 120. In this way, the valid-page-position table can be updated easily during accessing the flash chips. This is for illustrative purposes only, and is not meant to be a limitation of the present invention. According to a variation of this embodiment, the valid-page-position table can be loaded from the volatile memory 120 and stored in one or more of the NV memory elements 140_0, 140_1, . . . , and 140_N before shutting down the memory apparatus 100. More particularly, the valid-page-position table can be stored in one or more link blocks of the NV memory elements 140_0, 140_1, . . . , and 140_N. In this way, the valid-page-position table can be preserved while the memory apparatus 100 shuts down. While turning on the memory apparatus 100 next time, the valid-page-position table can be easily obtained from the link block(s).

In another embodiment, during accessing the memory apparatus 100, the valid-page-position table and global page address linking table can be loaded from the volatile memory 120 and stored in the NV memory elements from time to time. For example, the valid-page-position table and global page address linking table can be stored in every predetermined time period (e.g. 2 second) or in every predetermined accessing operations (e.g. 100 times of writing). When the memory apparatus 100 is abnormally shutting down, the latest valid-page-position table and global page address linking table are not loaded from the volatile memory 120 and stored in the NV memory elements. Then, the memory apparatus 100 is turning on. For building the valid-page-position table, the processing unit 110 can search the blocks that have been accessed after the latest updating of the valid-page-position table and global page address linking table in the NV memory elements. The processing unit 110 searches logical page addresses stored in each page of these blocks to build and update the global page address linking table. After that, the valid-page-position table can be built according to the updated global page address linking table.

In contrast to the related art, the present invention method and apparatus can greatly save the time of building logical-to-physical page address linking table(s), such as the global page address linking table. Therefore, the present invention provides better performance than the related art.

It is another advantage of the present invention that the present invention method and apparatus can record the usage information during accessing the pages, and therefore can efficiently manage the usage of all blocks according the usage information. As a result, the arrangement of the spare region and the data region can be optimized.

In addition, managing the flash memory on a basis of page brings lots of advantages. For example, the speed of random write is greatly improved, and the write amplification index can be greatly reduced. Without introducing side effects such as those of the related art, managing the flash memory on a basis of page can be much simpler and more intuitional than managing the flash memory on a basis of block as long as the present invention is applied in real implementation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a memory apparatus, the memory apparatus comprising at least one non-volatile (NV) memory element, each of which comprises a plurality of blocks, and a processing unit, the method being performed by the processing unit and comprising:

providing at least one block of the memory apparatus with at least one local page address linking table within the memory apparatus, wherein the at least one local page address linking table comprises linking relationships between physical page addresses and logical page addresses of a plurality of pages; and building a global page address linking table of the memory apparatus according to the at least one local page address linking table;

wherein the step of providing the block of the memory apparatus with the local page address linking table within the memory apparatus further comprises:

building a temporary local page address linking table for the local page address linking table corresponding to programming/writing operations of the memory apparatus; and temporarily storing the temporary local page address linking table in a volatile memory of the memory apparatus, and further updating the temporary local page address linking table if any linking relationship between a physical page address and a logical page address of a page in the block is changed.

2. The method of claim 1, wherein the temporary local page address linking table is temporarily stored in the volatile memory and updated, before the data pages in the block are fully programmed.

3. The method of claim 1, wherein the step of providing the block of the memory apparatus with the local page address linking table within the memory apparatus further comprises:

copying the temporary local page address linking table to build the local page address linking table.

4. A memory apparatus, comprising:

at least one non-volatile (NV) memory element, each of which comprises a plurality of blocks; and a processing unit arranged to manage the memory apparatus according to a program code embedded in the processing unit or received from outside the processing unit, wherein the processing unit is arranged to provide at least one block of the memory apparatus with at least one local page address linking table within the memory apparatus, and the at least one local page address linking table comprises linking relationships between physical page addresses and logical page addresses of a plurality of pages, wherein the processing unit is arranged to build a global page address linking table of the memory apparatus according to the at least one local page address linking table;

wherein the processing unit builds a temporary local page address linking table for the local page address linking table corresponding to programming/writing operations of the memory apparatus; and wherein before the data pages in the block are fully programmed, the processing unit temporarily stores the temporary local page address linking table in a volatile memory of the memory apparatus, and further updates the temporary local page address linking table if any linking relationship between a physical page address and a logical page address of a page in the block is changed.

5. The memory apparatus of claim 4, wherein the temporary local page address linking table is temporarily stored in the volatile memory and updated, before the data pages in the block are fully programmed.

6. The memory apparatus of claim 4, wherein the processing unit copies the temporary local page address linking table to build the local page address linking table.

* * * * *